(12) United States Patent
Xavier et al.

(10) Patent No.: US 9,521,142 B2
(45) Date of Patent: Dec. 13, 2016

(54) SYSTEM AND METHOD FOR GENERATING PASSWORDS USING KEY INPUTS AND CONTEXTUAL INPUTS

(71) Applicant: inBay Technologies Inc., Ottawa (CA)

(72) Inventors: Stanislus K. Xavier, Ottawa (CA); Robert Steklasa, Ottawa (CA); Nicolas Bettenburg, Ottawa (CA); Randy Kuang, Ottawa (CA)

(73) Assignee: inBay Technologies Inc., Ottawa (CA)

( * ) Notice: Subject to any disclaimer, the term of this patent is extended or adjusted under 35 U.S.C. 154(b) by 0 days.

(21) Appl. No.: 14/577,661

(22) Filed: Dec. 19, 2014

(65) Prior Publication Data

US 2015/0128234 A1    May 7, 2015

Related U.S. Application Data

(63) Continuation-in-part of application No. 13/913,399, filed on Jun. 8, 2013, now Pat. No. 8,973,111, which is
(Continued)

(51) Int. Cl.
*G06F 21/00* (2013.01)
*H04L 29/06* (2006.01)
(Continued)

(52) U.S. Cl.
CPC ............. *H04L 63/083* (2013.01); *G06F 21/36* (2013.01); *G06F 21/46* (2013.01);
(Continued)

(58) Field of Classification Search
CPC .................................................. H04L 63/083
See application file for complete search history.

(56) References Cited

U.S. PATENT DOCUMENTS 7,363,494 B2    4/2008  Brainard et al.
7,475,247 B2    1/2009  Bade et al.
(Continued)

FOREIGN PATENT DOCUMENTS

WO    2007026228        3/2007
WO    2008024454 A1    2/2008

OTHER PUBLICATIONS

International Application No. PCT/CA2010/000127, International Search Report and Written Opinion dated May 18, 2010.
(Continued)

*Primary Examiner* — Morshed Mehedi
(74) *Attorney, Agent, or Firm* — Borden Ladner Gervais LLP; Shin Hung

(57) ABSTRACT

A method and system for automatically generating a new password from user selected characters via key press which are different from the user selected characters. Each key of a keypad can be entered within one or more contexts, manually selected by the user or automatically selected by the described system, such that the same key press within one context provides a unique code different than the same key press within another context. The code corresponding to the proper combination of a key press, the contexts of the selected key press, and the sequence of entry must match the previously stored code set by the user. Context selection is not based on any of the possible key presses selectable on the keypad. Therefore if the password characters are discovered without the context for each character, then it becomes difficult to access the content. The newly generated password can be the same length as the originally entered password, or can be longer or shorter in length than the originally entered password.

19 Claims, 24 Drawing Sheets

Related U.S. Application Data a continuation of application No. 13/035,830, filed on Feb. 25, 2011, now Pat. No. 8,468,582, which is a continuation-in-part of application No. 12/639,464, filed on Dec. 16, 2009, now Pat. No. 8,510,811.

(60) Provisional application No. 61/920,257, filed on Dec. 23, 2013, provisional application No. 61/416,270, filed on Nov. 22, 2010, provisional application No. 61/248,047, filed on Oct. 2, 2009, provisional application No. 61/247,223, filed on Sep. 30, 2009, provisional application No. 61/183,830, filed on Jun. 3, 2009, provisional application No. 61/149,501, filed on Feb. 3, 2009.

(51) Int. Cl.
 G06F 21/36 (2013.01)
 G06F 21/46 (2013.01)

(52) U.S. Cl.
 CPC ...... *H04L 63/0861* (2013.01); *H04L 63/0869* (2013.01); *H04L 63/0281* (2013.01); *H04L 63/0853* (2013.01); *H04L 63/105* (2013.01)

(56) References Cited

U.S. PATENT DOCUMENTS

| | | |
|---|---|---|
| 7,502,933 B2 | 3/2009 | Jakobsson et al. |
| 7,516,483 B2 | 4/2009 | Brennan |
| 7,562,385 B2 | 7/2009 | Thione et al. |
| 7,565,536 B2 | 7/2009 | Vassilev et al. |
| 7,912,916 B2 | 3/2011 | Rakowski et al. |
| 7,925,556 B1 | 4/2011 | Duncan et al. |
| 8,201,237 B1 | 6/2012 | Doane et al. |
| 8,209,381 B2 | 6/2012 | Sinn et al. |
| 9,009,814 B1* | 4/2015 | Wertz .............. G06F 21/46 713/168 |
| 2002/0023960 A1 | 2/2002 | Knowles et al. |
| 2002/0033418 A1 | 3/2002 | Knowles et al. |
| 2002/0115457 A1 | 8/2002 | Koscal |
| 2003/0009693 A1* | 1/2003 | Brock .............. G06F 21/554 726/23 |
| 2003/0037261 A1 | 2/2003 | Meffert et al. |
| 2004/0046031 A1 | 3/2004 | Knowles et al. |
| 2004/0073797 A1 | 4/2004 | Fascenda |
| 2004/0128547 A1 | 7/2004 | Laidlaw et al. |
| 2004/0243835 A1 | 12/2004 | Terzis et al. |
| 2005/0198501 A1 | 9/2005 | Andreev et al. |
| 2005/0262083 A1 | 11/2005 | Brown |
| 2006/0041933 A1 | 2/2006 | Yakov et al. |
| 2006/0198517 A1 | 9/2006 | Cameron et al. |
| 2006/0206918 A1* | 9/2006 | McLean .............. G06F 21/36 726/2 |
| 2006/0282662 A1 | 12/2006 | Whitcomb |
| 2006/0288228 A1* | 12/2006 | Botz ................ G06F 21/31 713/182 |
| 2007/0022469 A1 | 1/2007 | Cooper et al. |
| 2007/0056025 A1 | 3/2007 | Sachdeva et al. |
| 2007/0199054 A1 | 8/2007 | Florencio et al. |
| 2007/0250920 A1 | 10/2007 | Lindsay |
| 2008/0028206 A1 | 1/2008 | Sicard et al. |
| 2008/0040783 A1 | 2/2008 | Larson et al. |
| 2008/0059804 A1 | 3/2008 | Shah et al. |
| 2008/0162925 A1 | 7/2008 | Okaya |
| 2008/0212771 A1 | 9/2008 | Hauser |
| 2008/0222299 A1 | 9/2008 | Boodaei |
| 2008/0229402 A1 | 9/2008 | Smetters et al. |
| 2009/0125993 A1 | 5/2009 | Delia et al. |
| 2009/0132808 A1 | 5/2009 | Baentsch et al. |
| 2009/0165121 A1* | 6/2009 | Kumar .............. G06F 21/316 726/19 |
| 2009/0185687 A1 | 7/2009 | Wankmueller et al. |
| 2009/0198618 A1 | 8/2009 | Chan et al. |
| 2009/0203355 A1* | 8/2009 | Clark ................ G06F 21/32 455/411 |
| 2009/0235339 A1* | 9/2009 | Mennes .............. G06F 21/33 726/5 |
| 2009/0259839 A1 | 10/2009 | Jung et al. |
| 2009/0300721 A1 | 12/2009 | Schneider |
| 2009/0313691 A1 | 12/2009 | Chien |
| 2010/0180328 A1 | 7/2010 | Moas |
| 2011/0296486 A1 | 12/2011 | Burch et al. |
| 2012/0174204 A1* | 7/2012 | Sturm ............... G06F 21/31 726/7 |
| 2012/0235912 A1* | 9/2012 | Laubach ........... G06F 3/04895 345/163 |
| 2013/0173484 A1 | 7/2013 | Wesby |
| 2013/0205404 A1 | 8/2013 | King |
| 2013/0227661 A1* | 8/2013 | Gupta .............. G06F 21/31 726/6 |

OTHER PUBLICATIONS

Menezes, "Handbook-Applied-Cryptography", CRC Press LLC, 1997, pp. 359-363; pp. 388-391; pp. 394-399; pp. 490-491; pp. 548-550.

http://asseco-see.com/nbv5/images/stories/presentations/NBV%20Authentication.pdf, presented during "New Banking Vision 5" from May 25-28 in Hotel "Sol Coral" Umag, Croatia, 2010, 35 pages.

Pashalidis et al., "Single Sign-On Using Trusted Platforms", Royal Holloway, University of London, Egham, Surrey, TW20 OEX, United Kingdom, http://www.isg.rhul.ac.uk, retrieved online as early as Jul. 24, 2012, pp. 1-15.

Hegt, "Analysis of Current and Future Phishing Attacks on Internet Banking Services", Technische Universiteit Eindhoven, Department of Mathematics and Computer Science, Master Thesis, May, 2008, pp. 1-149.

Naumann et al., "Privacy and Security Risks when Authenticating on the Internet with European eID Cards", Risk Assessment Report, Nov. 26, 2009, 41 pages.

Schneier, "Schneier on Security", A blog covering security and security technology, Nov. 23, 2004, 13 pages.

European Payments Council, "Customer-To-Bank Security Good Practices Guide", http://europeanpaymentscouncil.eu/ documents, Mar. 15, 2009, 34 pages.

Cavoukian, "Privacy by Design . . . Take the Challenge", Information and Privacy Commissioner of Ontario Canada, Aug. 2008, 361 pages.

Cavoukian, "Privacy by Design . . . Take the Challenge", http://www.privacybydesign.ca/publications.htm, Nov. 9, 2009, 2 pages.

Zhang, "Network Security Middleware Based on USB Key", Fifth IEEE International Symposium on Embedded Computing, Oct. 6-8, 2008, pp. 77-81.

http://www.sestus.com, "Virtual Tokens", retrieved online as early as May 12, 2011, 2 pages.

Boyd, David, "Single Sign-On to the Web with an EMV Card", International Symposium on Collaborative Technologies and Systems, May 2008, pp. 112-120.

Mackenzie et al., "Networked Cryptographic Devices Resilient to Capture", Proceedings of the IEEE Symposium on Security and Privacy, May 2001, pp. 12-25.

* cited by examiner

| Number | Binary mapping |
|--------|---------------|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

| Number | Context A | Context B | Context C | Context D |
|---|---|---|---|---|
| 0 | 100010 | 000100 | 010110 | 111000 |
| 1 | 100011 | 000101 | 010111 | 111001 |
| 2 | 100100 | 000110 | 011000 | 110000 |
| 3 | 100101 | 000111 | 011001 | 110001 |
| 4 | 100110 | 001000 | 010000 | 110010 |
| 5 | 100111 | 001001 | 000001 | 110011 |
| 6 | 101000 | 000000 | 010010 | 110100 |
| 7 | 101001 | 000001 | 010011 | 110101 |
| 8 | 100000 | 000010 | 010100 | 110110 |
| 9 | 100001 | 000011 | 010101 | 110111 |

FIG. 7

| Input | Key Code Data | Context Identifier |
|---|---|---|
| 0 | Code 0 | M1 |
| 1 | Code 1 | M1 |
| 2 | Code 2 | M1 |
| 3 | Code 3 | M1 |
| 4 | Code 4 | M1 |
| 5 | Code 5 | M1 |
| 6 | Code 6 | M1 |
| 7 | Code 7 | M1 |
| 8 | Code 8 | M1 |
| 9 | Code 9 | M1 |
| Biometric 1 | Code 1 | M2 |
| Biometric 2 | Code 1 | M3 |
| Biometric 3 | Code 1 | M4 |

| Input | Key Code Data | Context Identifier |
|---|---|---|
| 0 | Code 0 | M1 |
| 1 | Code 1 | M1 |
| 2 | Code 2 | M1 |
| 3 | Code 3 | M1 |
| 4 | Code 4 | M1 |
| 5 | Code 5 | M1 |
| 6 | Code 6 | M1 |
| 7 | Code 7 | M1 |
| 8 | Code 8 | M1 |
| 9 | Code 9 | M1 |
| Biometric 1 | Code 1 | M2 |
| Biometric 2 | Code 3 | M3 |
| Biometric 3 | Code 6 | M4 |

US 9,521,142 B2

SYSTEM AND METHOD FOR GENERATING PASSWORDS USING KEY INPUTS AND CONTEXTUAL INPUTS

CROSS REFERENCE TO RELATED APPLICATIONS

This application claims benefit of priority from Provisional Patent Application No. 61/920,257 filed on Dec. 23, 2013, and is a Continuation-In-Part of U.S. patent application Ser. No. 13/913,399 filed on Jun. 8, 2013, which is a continuation of Ser. No. 13/035,830 filed on Feb. 25, 2011, now issued as U.S. Pat. No. 8,468,582 on Jun. 18, 2013 claiming priority from Provisional Patent Application No. 61/416,270 filed on Nov. 22, 2010, which is a Continuation-In-Part of U.S. patent application Ser. No. 12/639,464 filed on Dec. 16, 2009, now issued as U.S. Pat. No. 8,510,811 on Aug. 13, 2013 claiming priority from Provisional Patent Application No. 61/248,047 filed on Oct. 2, 2009, Provisional Patent Application No. 61/247,223 filed on Sep. 30, 2009, Provisional Patent Application No. 61/183,830 filed on Jun. 3, 2009 and Provisional Patent Application No. 61/149,501 filed on Feb. 3, 2009, the contents of which are hereby incorporated by reference.

FIELD

The present disclosure relates generally to computer security applications. More particularly, the present disclosure relates to generating passwords or a personal identification number (PIN).

BACKGROUND

Passwords, such as Personal Identification Numbers (PINs) and other Personal Identification Codes, are widely used as a critical input in authentication systems, and serve as the foundation of identity assurance. In the present description, a password or PIN refers to either an input string or the machine language code equivalent of an input string. These passwords are typically set by users to prevent unauthorized users to access their content. FIG. 1 is an illustration of the interaction between a user, electronic devices and services. As shown in FIG. 1, a user 10 owns a mobile device, such as a computing tablet 12, smartphone or other personal digital assistant 14, or a laptop computer or workstation 16. Each of these devices may store data that the user 10 does not wish others to have access to. Such data is referred generically as content, and such devices can be configured to have a security access screen requesting a password before the content of the device can be accessed. The user 10 may have occasion to access other systems they do not own, and are operated by another commercial entity, such as an automatic bank teller machine (ATM) 18 or a point of sale device. These devices may be linked to an account of the user 10 held by a financial institution for accessing funds to pay for services or goods. Often, a password is required to gain access to the account content.

Once the user 10 has gained local access to their tablet 12, smartphone 14 or laptop 16, they may have access to the Internet 20 offering web-based services that store sensitive data 22, such as account data. Such web-based services require another password before access to the data is granted. The previously discussed examples of content that require a password to access is non-exhaustive, and there can be many types of content where privacy and security requirements necessitate the use of a password for access.

FIG. 2 is a table showing an example mapping of numbers typically found on a numeric keypad, either a physical keypad or a virtual on-screen keypad, which are used to enter a PIN. Each key press has an associated key code which represents the character that is selected by the key press. In the present example, a binary code is mapped to each selectable number so that a processor can recognize and distinguish between the selected numbers.

FIG. 3 is a simplified example showing a password authentication process in an electronic device using the mapping table of FIG. 2. In the present example, the password is a PIN and it is assumed that a PIN has been preset and stored in memory already. Through a user interface 30 of the device, the 4 digit/character PIN of "4437" is entered, which is encoded with the corresponding binary values of FIG. 2 by a key encoder and provided to a processor of the electronic device. A host security system 32 operating in the memory of the device compares the machine code version of the PIN with the preset PIN stored in memory 34. If the numbers and sequence match, then access is granted to the content. Otherwise, access to the content is denied. The host security system 32 can be firmware or software code operating in the device to either access the device itself, or can be an application hosted by a web-based server. The memory 34 can be volatile or non-volatile memory of the device.

A problem exists in balancing convenience of remembering a password versus the security level provided by that password. It is well established that a longer password offers a higher level of security for protecting content stored locally in an electronic device, or on a web-based server via networks. Longer passwords are less likely to be guessed by another user.

However, users often have difficulty remembering long passwords, and therefore rely on short passwords for convenience reasons, thus sacrificing security. Some users find complex passwords difficult to remember, and simply enter the same digit or character multiple times for the length of the password. Sometimes, users store their passwords in a document on their device or transcribe them onto paper or other physical medium, which can be discovered by others. In other cases, users follow simple key entry gesture patterns to facilitate remembering even a short password, which can be easily guessed by another user. Unfortunately, such short or trivial passwords are more easily compromised and greatly increase the probability of security breaches.

Accordingly, there is a need for a method and system which allows entry of passwords of any length while providing a high level of security, for accessing computer devices or network-based resources, such as Internet web-based accounts for example.

SUMMARY

It is an object of the present disclosure to obviate or mitigate at least one disadvantage of previous password generation systems.

In a first aspect, the present disclosure provides a system for generating password data from user selected characters on a computing device. The system includes an interface and a password generator. The interface is configurable to operate in one or more contexts for providing code data corresponding to each entry of a user entered password. The password generator receives each code data and context data corresponding to one or more contexts during which each code data was entered, for converting the code data and the corresponding context data into a new password. According to one embodiment, the interface includes a feedback generator for providing an indicator in response to selection of either of the one or more contexts. In another embodiment, the interface can include a context input interface for selecting the one or more contexts, where the context input interface includes a physical button of the computing device for selecting one or more contexts when depressed; a graphical interface of the computing device for selecting one or more contexts when touched; a sensor of the computing device for selecting one or more contexts when different orientations of the computing device is detected; or a biometric sensor for selecting one or more contexts in response to a match between a sensed biometric parameter and a reference parameter.

In yet another alternate embodiment, the interface can include a keypad input interface configurable to operate in one or more contexts, where each same key of the keypad interface provides different code data when operating in a different context. In this embodiment, the password generator includes context mapping tables each selectable by the context input interface for converting received code data corresponding to each entry of a user entered password into new code data different than the received code data, and a character length of the new password can be the same as the user entered password. In another embodiment, the context input interface can include a context detector for sensing a parameter of an external context, and for automatically setting one or more contexts when an external context is detected, where the external context can include any one of geographic position, time of day, date, network presence and a biometric.

In a further alternate embodiment, the interface includes a keypad input interface providing the code data corresponding to each entry of a user entered password, and the context input interface is configured to provide context data corresponding to the selected context for each entry. In this particular embodiment, the password generator can include a hash function generator for converting the code data and corresponding context data of the user entered password entries into the new password, and a character length of the new password is greater than the user entered password.

In an embodiment of the first aspect, the feedback generator includes a graphical display for providing a visual indication in response to selection of either of the one or more contexts. Alternately, the feedback generator includes a haptic feedback system for providing a physical indication in response to the selection of either of one or more contexts. In this embodiment, the physical indication includes at least one of audible sounds and vibration of the computing device. In yet a further embodiment, the interface includes a keypad input interface responsive to key press entries and biometric inputs, where a sequence of key press entries and biometrics corresponds to the user entered password.

In a second aspect, the present disclosure provides a password authentication system including a user interface, a display, a feedback generator, a password generator and a host security system. The user interface enables selection of specific characters from a set of characters, and provides a key code corresponding to each of the specific characters and a context identifier corresponding to a selected context for each key code. The display displays the specific characters. The feedback generator provides an indicator of the selected context. The password generator is configured to convert the key code corresponding to each of the specific characters and the context identifier corresponding to a selected context for each key code into an authentication password. The host security system compares the authentication password to a preset authentication password, and grants access to content when the authentication password matches the preset authentication password.

In a third aspect the present disclosure provides a method for generating a new password from user selected keys of a keypad input interface. The method includes setting one or more contexts for the keypad input interface for each of the selected keys in response to a context selection from a context input interface; providing a feedback indicator in response to selection of one or more contexts; executing a function corresponding to the context selection to transform key codes corresponding to each of the selected keys into the new password; and displaying characters corresponding to the selected keys on a display.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 7 is an example context mapping table, according to a present embodiment;

DETAILED DESCRIPTION

Figure 1:
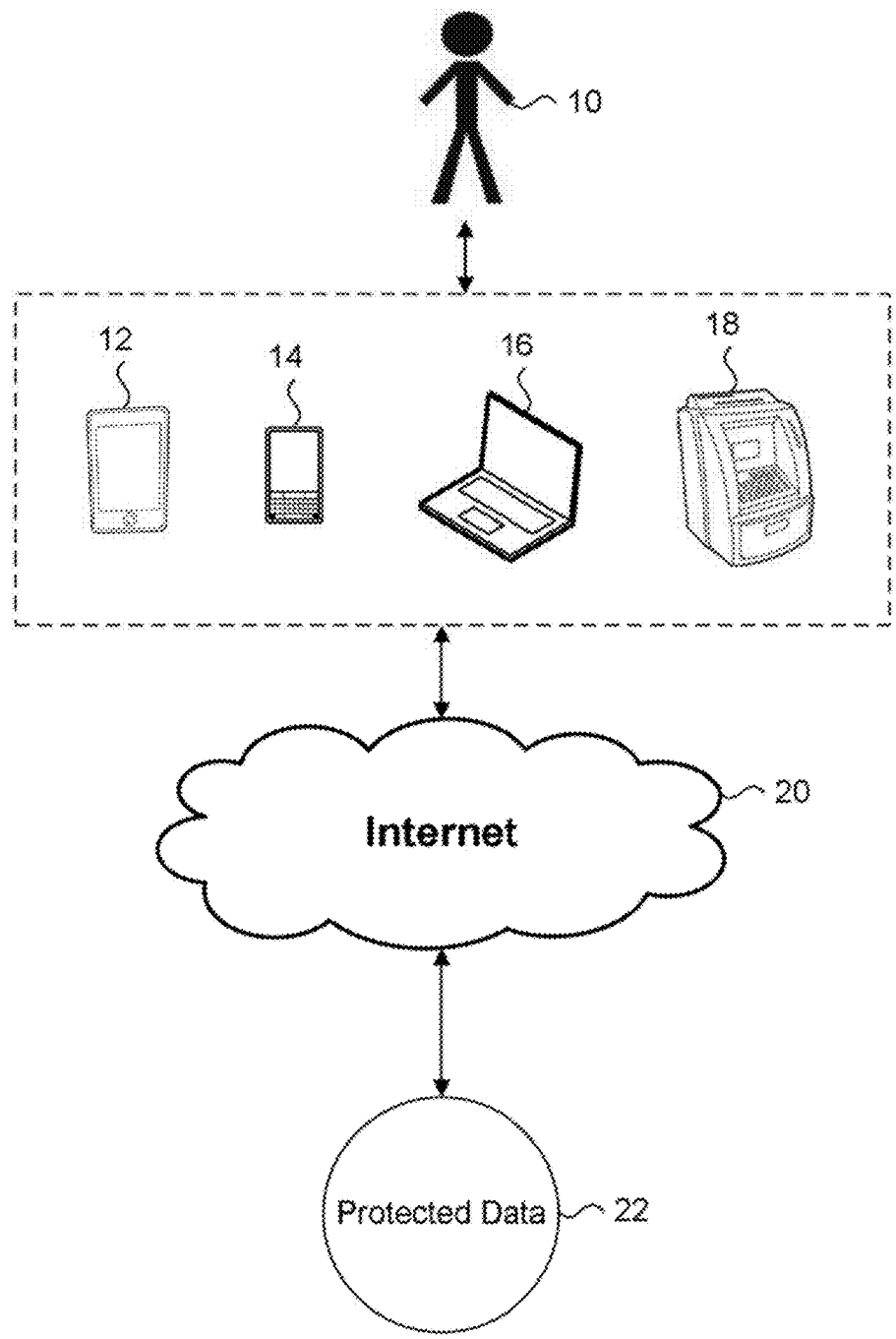
FIG. 1 is an illustration of the interaction between a user, electronic devices and services.

Generally, the present disclosure provides a method and system for automatically generating a new password from user selected characters via key press, which is different from the user selected characters. Each key of a keypad can be entered within one or more keypad contexts, such that the same key press within one context provides a unique code different than the same key press within another context. Contexts can include, by example, colour, sensor data and geographic location; a context can be manually selected by the user or automatically preselected by the system including the keypad. Moreover, multiple contexts can be combined to produce progressively stronger passwords. For example the resulting password generated by keypad entry of a password under a location-based context function can be used to initialize the salt of a second, hash-based, context function. The correct password can only be obtained from the hash-based context function operating in the right location.

According to the present embodiments, a context is a function that is applied to an input. By example, if the input consists of entering the numbers 1, 2, 3 and 4 from a keypad, a context function based on location could be implemented by multiplying each digit of the PIN with the latitude and longitude coordinates corresponding to the location of the input. This generates a stronger password because the input from a small number space ($10^4$) is transformed into a much larger number space by the context function (e.g., 180 latitudinal and 360 longitudinal coordinates yield $583,201^4$ possible combinations). According to the presently described embodiments, the context function can be any mathematical or transformational function which transforms the key press data.

The code corresponding to the proper combination of a key press, the context of the selected key press, and the sequence of entry must match the previously stored code set by the user. Context selection is not based on any of the possible key presses selectable on the keypad. Therefore if the password characters are discovered without the context for each character, then it becomes impossible to access the content. The newly generated password can be the same length (number of characters) as the originally entered password, or can be longer in length than the originally entered password.

The principle of operation of the presently described password authentication system is now described with reference to the embodiment FIG. 4. In the present embodiment, the password authentication system 100 includes a key input interface 102, a context input interface 104, an authentication password generator 106 and a host security system 108. The key input interface 102 can be a physical keypad or an on-screen keypad for receiving key press entries of a password, and can be part of a mobile device, computer, tablet or other machine such as an ATM. The context interface 104 can be any other input means allowing the user to select between one or more different contexts for the key input interface 102. This can be similar to setting a mode of the key input interface 102, and does not result in selection of an alternate character of the keypad, like a "shift" key on a keyboard which allows selection of extra characters associated with the same key. In one example, the contexts can be different colours associated with the key input interface 102.

The authentication password generator 106 is a functional block of a host device having the key input interface 102 and the context interface 104, or can be a functional block of a server system hosting a website. In either case, the authentication password generator 106 is configured to recognize and process information from the key input interface 102 and the context interface 104. In particular, the authentication password generator 106 executes a context function to transform key codes corresponding to key presses from the key input interface 102, using context identifiers from the context interface 104. In one embodiment, the authentication password generator 106 is firmware or code executed by the host device or the server system. The host security system 108 is responsible for comparing a password provided by the authentication password generator 106 to a stored password, and granting access to content. The host security system 108 can be a functional sub-block of the host device operating system to grant access to the device itself, or can be a functional sub-block of the website to grant access to a user account.

Figures 2, 3:
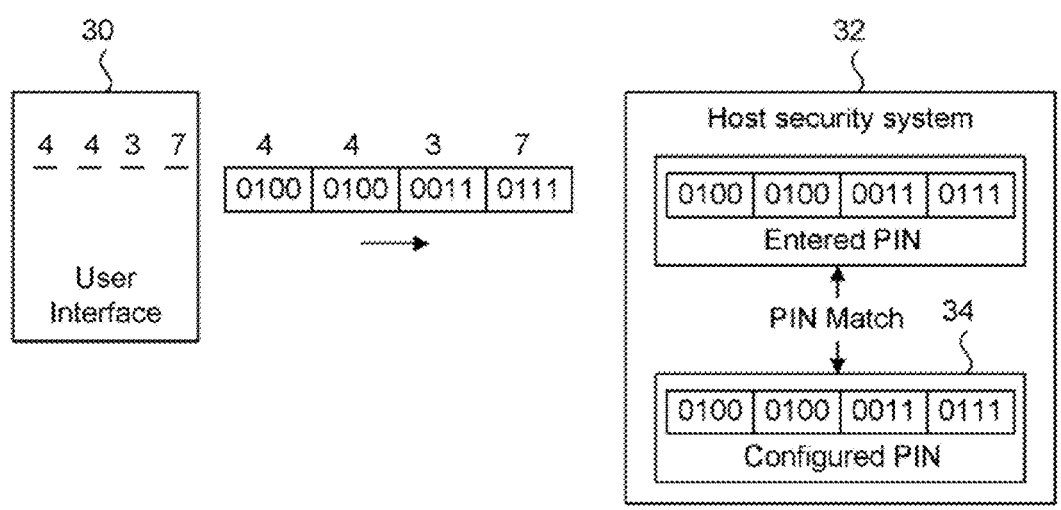
FIG. 2 is a table showing an example mapping of numbers to a machine code.
FIG. 3 is a simplified illustration of a password authentication process in an electronic device using the mapping table of FIG. 2.

In operation, a user first selects one or more different contexts via context interface 104. By example, selection of a context can be done by selecting from a special context menu on a display of the host device, performing a detectable gesture, pressing a physical button dedicated to a use other than character selection, or tilting or changing orientation of the host device, by example. In fact, any input to the electronic device other than a key press of a key input interface can be used to change or select a context. Once a particular context has been selected, represented as $m_1$ in the present example, the user then selects a character, such as the first character "4" via key press by example. Each character has a corresponding key code, such as the binary codes shown in FIG. 2. In the present example, the binary code of "0100" is used to represent the character "4". In the present example, subsequent key presses of "4", "3" and "7" follow, with corresponding selected contexts of $m_2$, $m_3$ and $m_4$ respectively. The variables "m1" to "m4" are used to represent a selected context function, and the numerical suffix indicates the context identifiers. In the present example, the output of a context function can be another binary code, and the resulting code for the key code modified by the associated context function is referred to as data authentication password segment.

Figure 4:
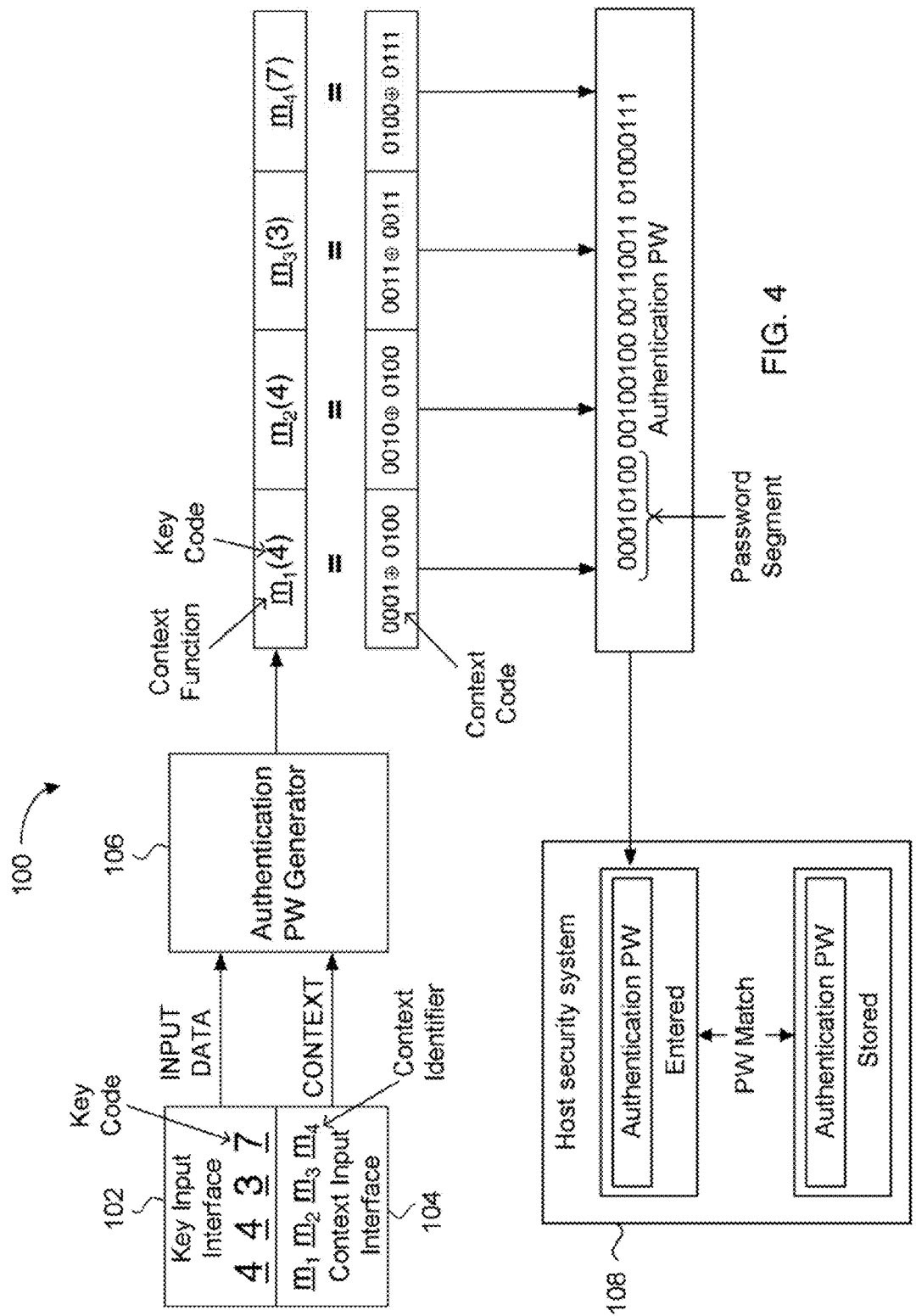
FIG. 4 is a simplified illustration of a password authentication system according to a present embodiment.

As shown in FIG. 4, the resulting transformation functions applied by the authentication password generator 106 are represented as "$m_1(4)$", "$m_2(4)$", "$m_3(3)$", and "$m_4(7)$". In other words, the key code data is transformed by the context function. In the example of FIG. 4, the transformation function of the current context is one of concatenation, where the binary value of the key press, referred to as a key code, and a function-specific context code are added together sequentially. For example, as the character "4" is selected, context function "m1" concatenates the binary code of "0100" representing the key code of "4" with the binary code of "0001" representing the unique context code for context function "m1". As shown in FIG. 4, each context function has a unique context code that is being concatenated to an input. Thus, context is an algorithm transforming an input.

The presently shown context function of concatenating a context code with a key code is just one method for encoding a user entered password with context information. The order of the key code and the context code can be reversed, or the context code and the key code can be integrated with each other. According to the present embodiments, the context can be any mathematical function that operates on the key code. In general, the key press data can be encoded by modifying the key code with the context function.

The input data, consisting of key code and context identifier, for each of the keys pressed within a particular context, is provided to the authentication password generator 106. In response to the received input data, the authentication PW generator 106 can be configured to generate a new password of the same length as the originally entered password. Alternately, the authentication PW generator 106 can generate a new password having a length longer than the originally entered password. By example, this new length can be the maximum length which can be accommodated by the host security system 108. Alternately, this new length can be some arbitrary length longer than the originally entered password length. In either configuration, the authentication PW generator 106 can generate a new password based on any type of encoding algorithm, such as any hash algorithm based number generator or one-way hash algorithm generator. Examples include the SHA-2 or bycrypt hash algorithms. This new password is referred to as an authentication password, and is not known to the user.

The authentication password is provided to the host security system 108 for matching against the preselected authentication password. It is noted that the preselected authentication password can be set using the same process described above for providing key codes and context identifiers, and for generating an authentication password. This preselected authentication password can be stored on the host device or the server system. Once a match is determined between the generated authentication password and the stored authentication password, access is granted to the content. It is noted that the authentication password generator 106 is an optional component which adds encryption-like security to the set of key codes and corresponding context identifiers of an entered password. In a variant of the embodiment of FIG. 4, the set of key codes and corresponding context identifiers can simply be provided to the host security system 108 for comparison to a preselected sequence of key codes and corresponding context identifiers.

An advantage of using an authentication password generator 106 is that it can add protection against reverse engineering or hacking attempts to discover the original key presses. This system is particularly effective against dictionary attacks, where the hash reverse engineering activity uses a file containing words, phrases, common passwords and other strings likely to be used as a password. Such files would not contain certain types of contextual inputs as disclosed in the present embodiments.

As previously mentioned, the password authentication system 100 can be implemented in any electronic device having a key input interface. It is well known that mobile devices, such as smart phones and tablets, are used by a large number of users and enable access to the internet and local content stored on the device itself. For the ease of illustration, embodiments of the present password authentication system are described for use in a mobile device such as a smart phone or a tablet. However, the following embodiments can be used in other computing devices.

Figure 5A:
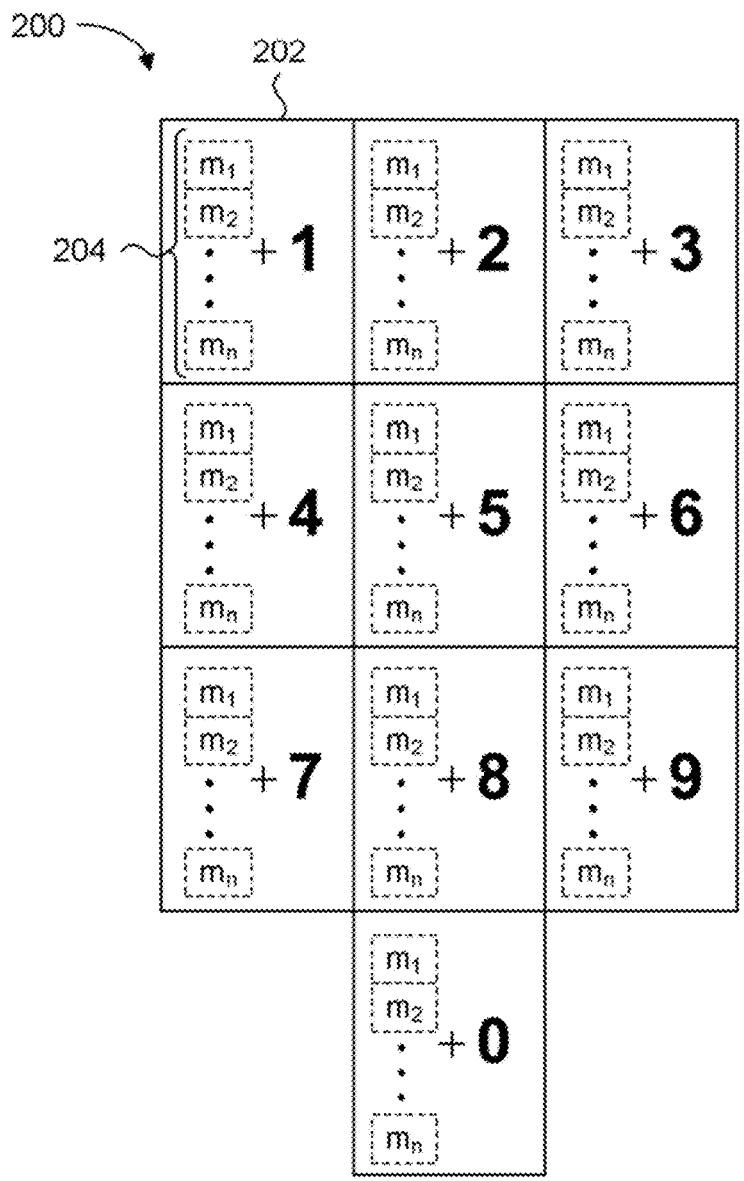
FIG. 5A is a diagram of a standard numeric keypad for use in a key press encoding scheme of the system of FIG. 4.

FIG. 5A is a diagram of a standard numeric keypad 200 to provide an example of the key press encoding scheme used in the embodiment of FIG. 4. Numeric keypad 200 can be either a physical keypad integrated into a mobile device by example, or an on-screen virtual keypad displayed on a screen of a tablet by example. The numeric keypad 200 uses Arabic numerals from 0-9, where each key 202 corresponds to a respective number. As previously mentioned, each key 202 is encoded to provide a unique key code that identifies the specific key press. For example, a key press encoder of the mobile device, tablet or other device can be configured with the character mapping of codes, such as UTF-8, UTF-16 and ASCII. It is noted that the presently described embodiments can use any type of key press encoding scheme. In the present embodiment of FIG. 5A each key 202 can be selected within one of n contexts 204, shown as contexts $m_1$ to $m_n$, where $m_1$ is a first context and $m_n$ is a last context. Each context function can be defined 204 to encode the input into a new and distinct key code. In the present embodiment, when a key 202 is selected within a selected context 204, two values are provided at the same time; a key code and a context identifier. Therefore, the i-th key code corresponding to the i-th key press made under context $m_j$ is defined by the following expression:

Key code$_i$=$m_j$(key press$_i$)

Accordingly, the same key 202 can generate a plurality of different key code data simply by changing the context. Therefore another person having knowledge of the user password will be denied access to the content if they do not know the correct context associated with each key press. By example, given that each digit of a password has 10 choices (0-9), there is a 1/10 probability that the proper digit is selected. However, assuming there are six possible contexts for each digit (eg. "$m_1$" to "$m_6$"), then the probability of guessing a single digit correctly decreases to 1/60. Thus, if the password required 4 key presses, the number of possible 4-digit passwords using six contexts would be 60^4=12,960,000, compared to 10^4=10,000 passwords using no context.

Transforming key presses through context functions can be used to generate a new password of different length than the user entered password, which is useful for accessing web-based accounts and other content where longer passwords are required. It is noted that the key press encoding scheme shown in FIG. 5A can be applied to any type of keypad, including keypads with both numbers, letters and symbols for example.

Figure 5B:
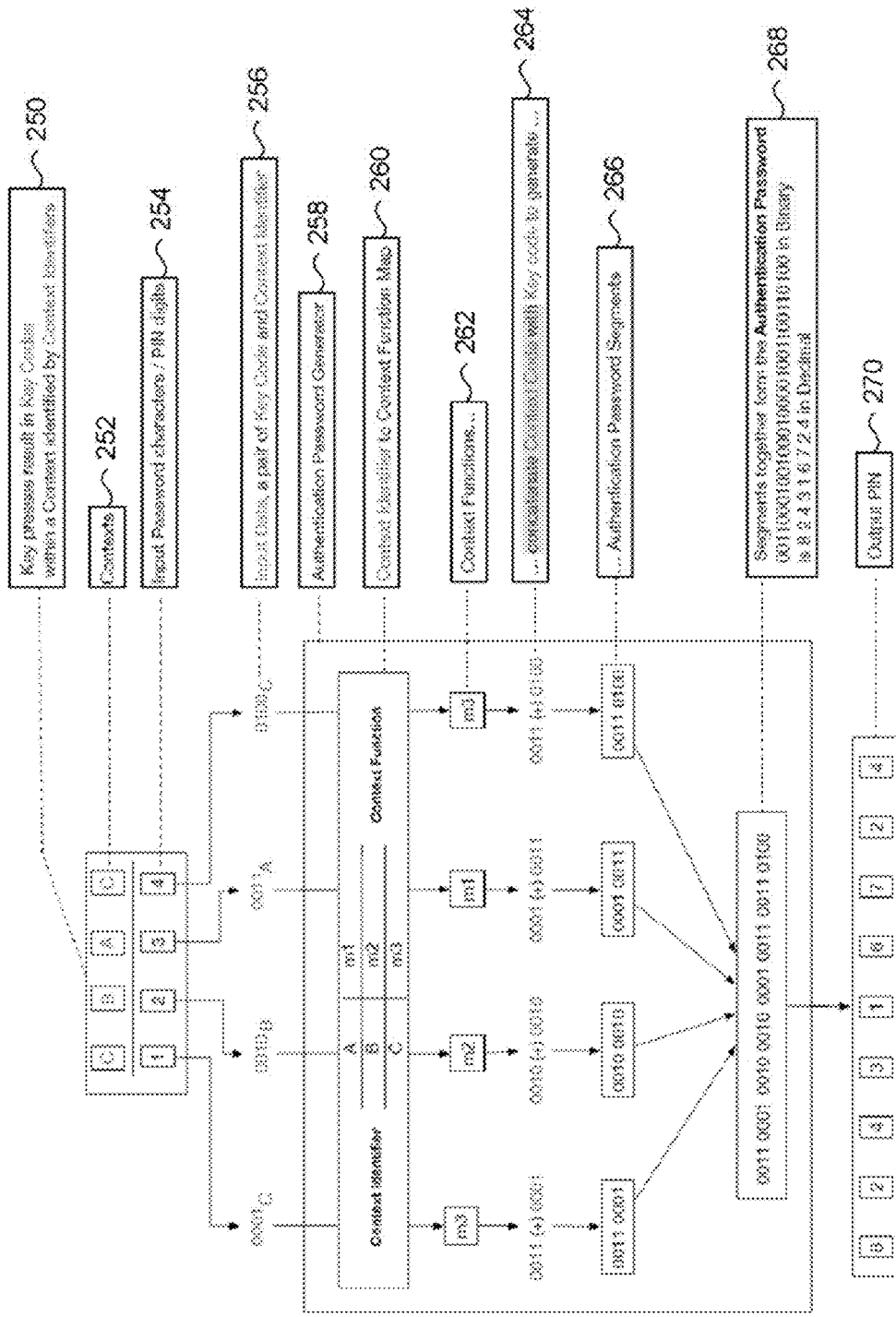
FIG. 5B is a diagram of the process of encoding input data consisting of key codes and context identifiers into a new authentication password through context functions.

FIG. 5B is a diagram of an example process of encoding input data consisting of key codes and context identifiers into a new authentication password through context functions, according to a present embodiment. The illustrated example process of FIG. 5B is similar to the process described for the embodiment of FIG. 4. FIG. 5B further summarizes the terms and expressions used throughout the present description. At 250, key presses result in Key Codes within a Context identified by Context Identifiers, where the Contexts and Input Password characters/PIN digits are designated by 252 and 254 respectively. The resulting Input Data then includes a pairing of a Key Code and a Context Identifier at 256. The Authentication Password Generator 258 receives the Input Data and executes a mapping of the Context Identifier to a Context Function Map at 260. This mapping identifies a specific context function to be executed. In the present example, the context function is one of concatenation. Thus context functions at 262 concatenate Context Codes with Key Codes at 264, to generate Authentication Password Segments at 266. All the Authentication Password Segments are assembled together to form an Authentication Password at 268, as "0011000100100010001001100110100" in binary. The resulting Output PIN 270 is 8 2 4 3 1 6 7 2 4 in decimal.

Figure 6:
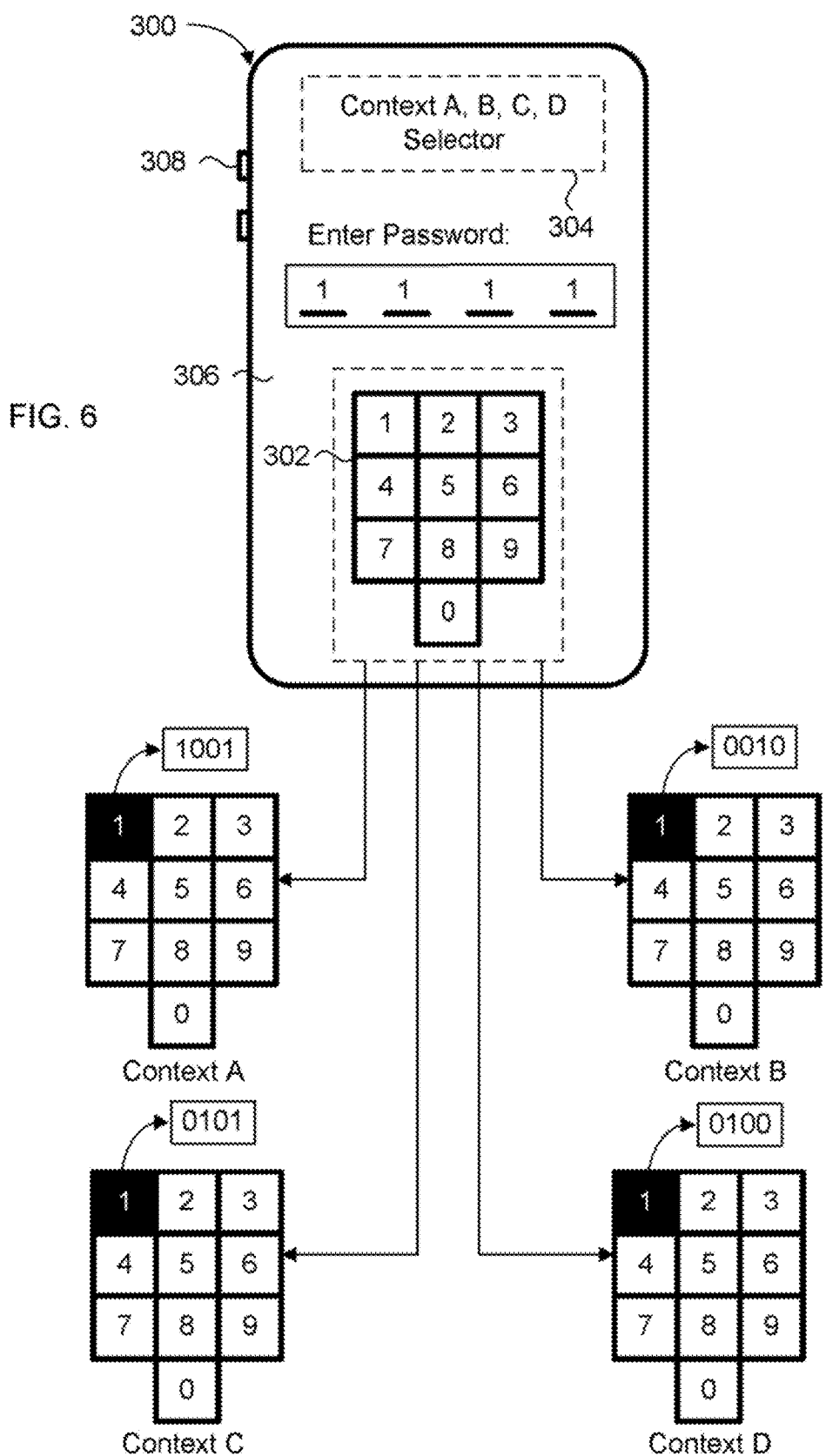
FIG. 6 is an example generic mobile device configured with the key press encoding scheme shown in the embodiment of FIG. 5A.

FIG. 6 is an example generic mobile device which can be configured with the key press encoding scheme shown in the embodiment of FIG. 5A. The mobile device 300, such as a smartphone or a tablet by example, includes a keypad input interface 302, a context input interface 304, a touchscreen display 306, dedicated function physical buttons 308 and sensors (not shown). The keypad input interface 302 can be either a physical keypad or an on-screen keypad. The touchscreen display 306 can be any size, and displays text prompting the user to input a password and to display the entered password, either with the selected character or an asterisk hiding the selected character. Commonly owned US Design patent number 29489133, which is incorporated herein by reference, shows an example keypad input interface which can be used in the presently described embodiments.

The context input interface 304 can be any type of input other than the keypad input interface 302 to enable context selection. Either the touchscreen display 306 or the context input interface 304 can further display the selected context, or implied context such as location, with any combination of shapes, colours and/or text. According to alternate embodiments, any type of output which can be sensed by the user (see, hear, feel), can be provided by the mobile device 300 to indicate the selected context. Specific examples of context input interface 304 and context selection indicators are described later.

While the embodiment of FIG. 4 can be used for generating long passwords based on a shorter user entered password, there are situations in which access to content is limited to a predetermined number of characters. FIG. 6 further illustrates a key press encoding method according to an alternate embodiment. In this embodiment, a new password of the same length as the user entered password can be generated in response to key code data and corresponding context identifier.

FIG. 6 shows an example where four possible contexts (A, B, C or D) can be selected for keypad input interface 302. Conceptually, each context selects a different keypad input interface 302, where the mapping key presses to key codes differs from context to context. As shown in the example of FIG. 6, selection of context A and selection of key "1" results in a key code of "1001". However, the same selected key "1" for contexts B, C and D all differ from each other. By example, this can be done by setting a default character mapping table for all the valid keys of the keypad input interface 302, and for each context defining a function for offsetting the order of the mapping to the keys by any predetermined amount. FIG. 7 shows a table of an example mapping of binary codes to each number of the keypad input interface 302 in different contexts. Context functions are omitted; only resulting outputs (password segments) are shown.

Since the host security system might require a fixed number of characters or digits for the password, the actual key codes remain the same as the host security system may be configured to recognize only the set of valid codes corresponding to the keys of the keypad input interface 302. Therefore by example, when the user enters character "1" in context A, a different number is provided to the host security system instead. Thus, a context changes the code mapping, so that the same selected input results in a different key code being provided. In this way, if the user selected password digits are discovered, but without the contexts for each digit, access to the content is unlikely as the contexts for each digit must also be guessed correctly.

Figure 8:
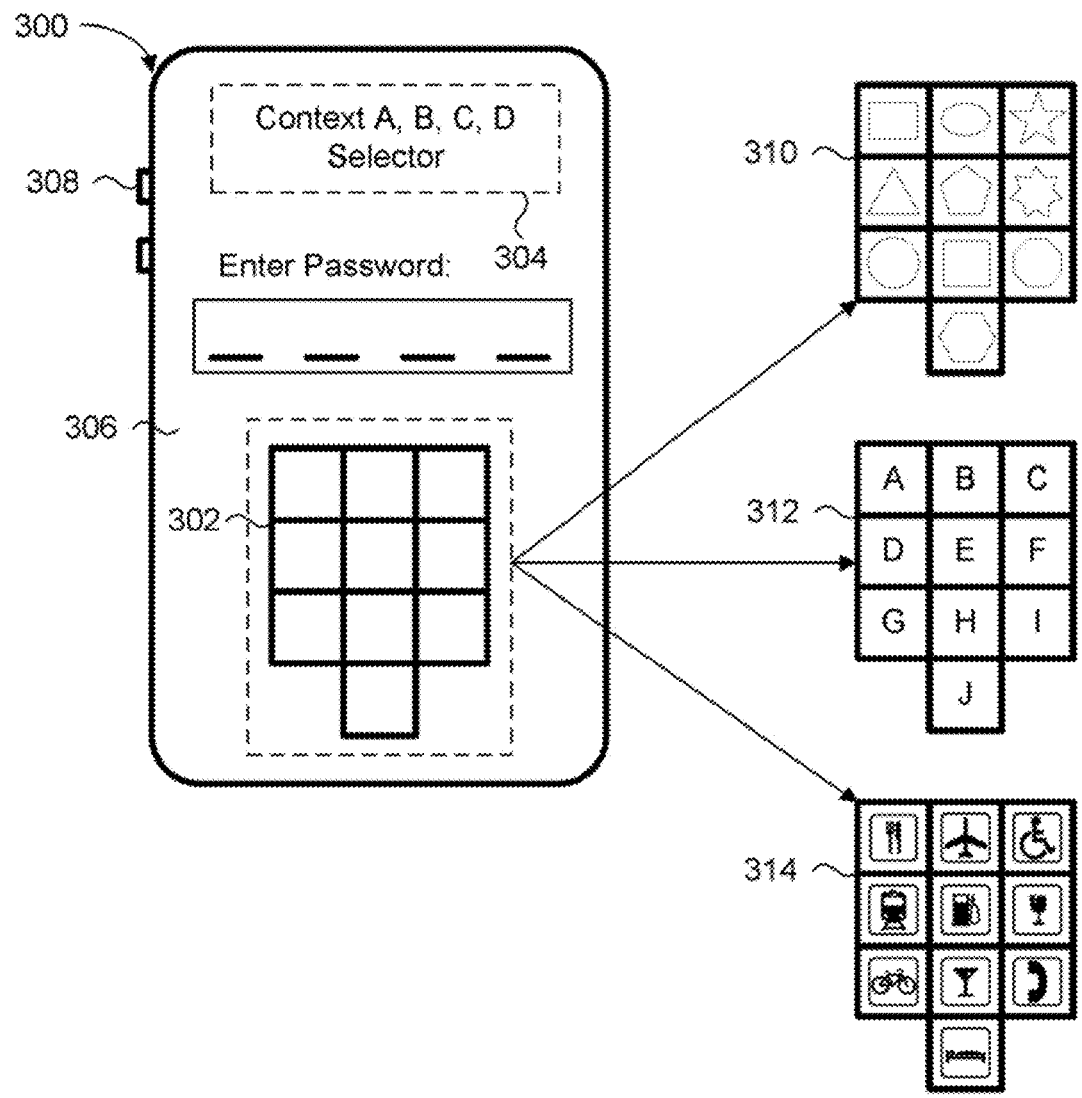
FIG. 8 is an example generic mobile device having different types of keypad input interfaces, according to present embodiments.

For the purposes of explanation only, the various embodiments described herein use a keypad input interface in the form of a numeric keypad consisting of 10 keys each representing one of numbers 0-9. However, different embodiments can use non-numeric keypads and any number of suitable keys. As shown in the embodiment of FIG. 8, the keypad input interface 302 can include keys with different shapes as shown by keypad input interface 310, or it can include keys with different letters as shown by keypad input interface 312, or it can include keys with different travel symbols as shown by keypad input interface 314. In the presently shown examples, keys of the same category (shape, letter or travel symbol) are used for any single keypad input interface. In further alternate embodiments, a mix of keys from different categories can be used for a single keypad input interface. Furthermore, any suitable number of keys and layout pattern of the keys can be used in these alternate embodiments.

As previously discussed, either the touchscreen display 306 or the context input interface 304 can further display the selected context with any combination of shapes, colours and/or text. According to a present alternate embodiment, the different keypad input interfaces shown in FIG. 8 can be used to display the selected context on the virtual on-screen keypad. For example, a user can use the context input interface 304 to select or toggle a context, which is displayed by changing the keypad input interface 302 from one category to another. Therefore, each category of keypad input interface represents a context which gives feedback to the user about the selected context. It is contemplated that future mobile devices can have physical keys where each physical key has its own independent control over different contexts, such as numbers, letters, shapes and symbols as shown in FIG. 8.

FIGS. 9 to 12 are embodiments illustrating different examples of context input interface 304 and of the feedback system used to indicate the selected context.

Figure 9:
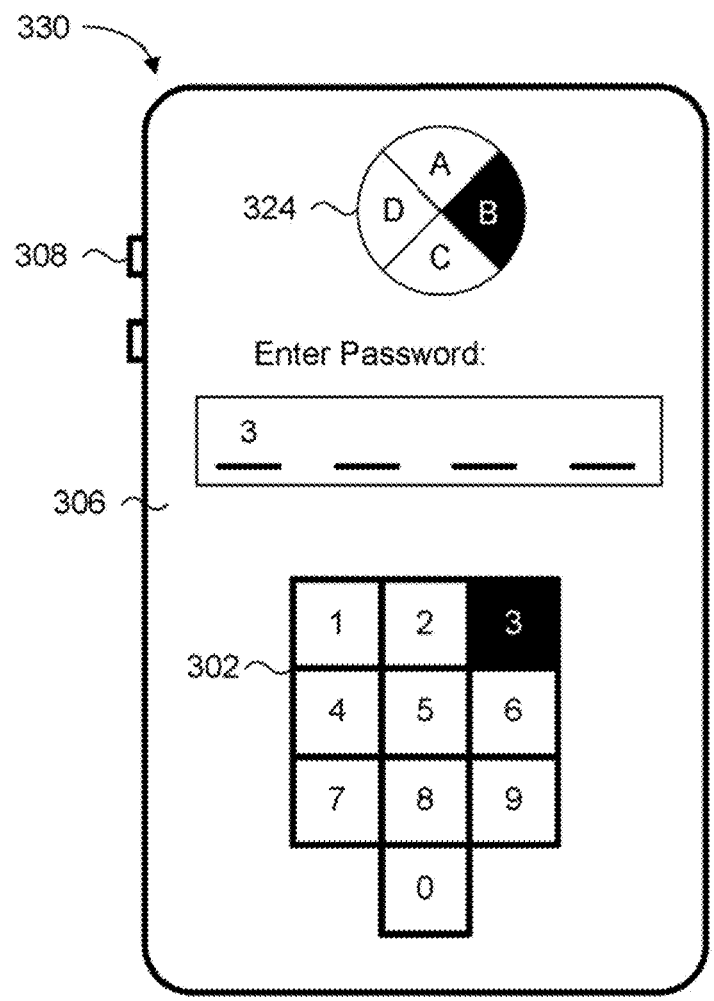
FIG. 9 is a diagram of a mobile device having a graphical context input interface, according to one embodiment.

The embodiment of FIG. 9 shows a mobile device 330, similar to the generic mobile device 300 shown in FIG. 6. The mobile device 330 includes the keypad input interface 302, touchscreen display 306 and dedicated function physical buttons 308. In the embodiment of FIG. 9, a graphical context input interface 324 in the shape of a circle divided up into sectors each labeled with letters "A", "B", "C" and "D", is presented on touchscreen display 306. To select a particular context, any one of the sectors is selected by touch, and the selected sector can be highlighted with a colour or some other graphical indication. The highlighting of the selected sector can persist until a key of keypad input interface 302 is selected, at which point the highlighting disappears. Alternately, the highlighting can persist after a key is selected. Now any selected key of keypad input interface 302 will provide input data that includes a key code and a context identifier, or a re-mapped key code based on the selected context function.

It is noted that a context is selected by touching the graphical context input interface 324, which integrates visual context selection feedback. While letters are used to indicate different selectable contexts, numbers, other characters, different colours or shapes can be used instead.

Figure 10:
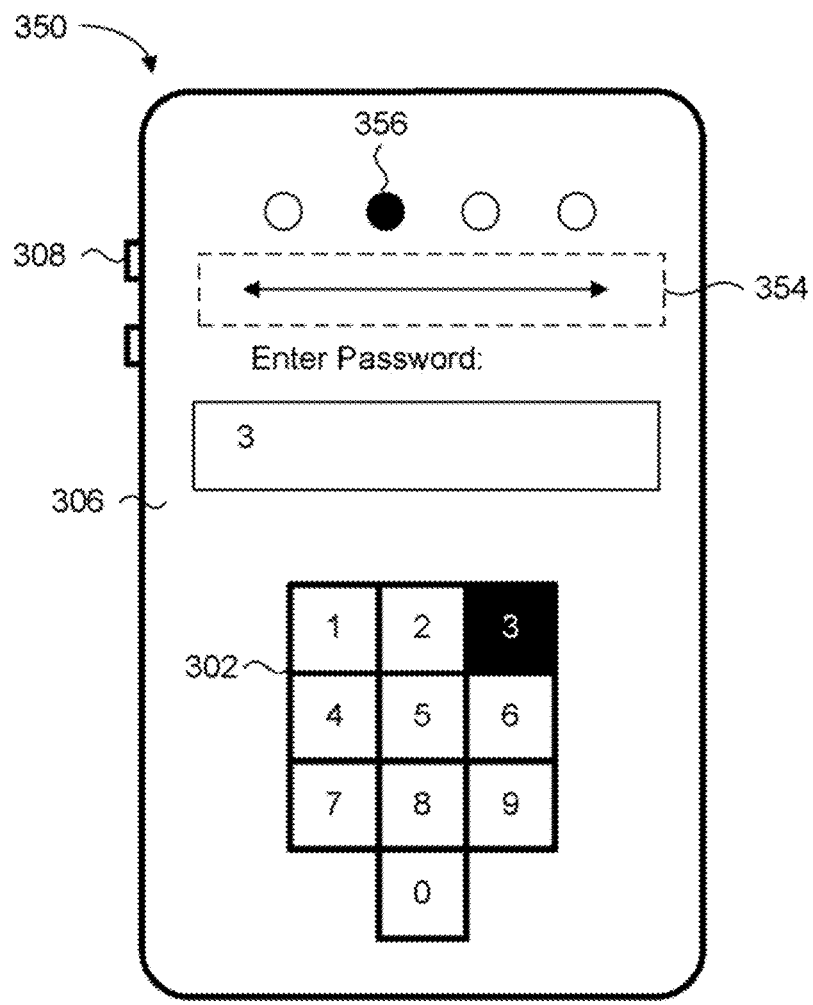
FIG. 10 is a diagram of a mobile device having a graphical context input interface, according to another embodiment.

The embodiment of FIG. 10 shows a mobile device 350, similar to the generic mobile device 300 shown in FIG. 6, where the same reference numbers correspond to the same previously described features. In the embodiment of FIG. 10, a context input interface swipe area 354 is provided on touchscreen display 306 to detect a left-to-right or right-to-left swipe by a user. A context feedback interface including graphical indicators 356 in the form of circles arranged in a geometric pattern indicates which context has been selected. The present example shows a possible of four selectable contexts. A linear arrangement of graphical feedback indicators 356 is used in the present example, and extends parallel to the direction of the context input interface swipe area 354. A user swiping left or right on touchscreen display 306 in the context input interface swipe area 354 toggles the keypad input interface 302 into a different context, with a corresponding highlighting of an indicator 356 in the direction of the detected swipe. Successive toggling selects the next context in accordance with a predetermined order. In an alternate embodiment, the context input interface swipe area 354 can be rotated 90 degrees to detect top-to-bottom or bottom-to-top swipes. While a linear arrangement of indicators 356 is intuitively matched to a swiping orientation, any geometric arrangement and shape of indicators 356 can be used.

One of the problems with entering passwords in a public environment is that others can see the characters being entered, and for the present embodiments, may see the selected context which is graphically displayed as feedback to the user. Because the embodiments of FIGS. 9 and 10 provide a graphical context input and feedback system, others could possibly deduce that context selection is needed for each selected key of the keypad input interface 302. According to an alternate embodiment, the mobile device can be configured to provide an invisible context input interface and/or provide discrete graphical feedback of the selected context.

Figure 11:
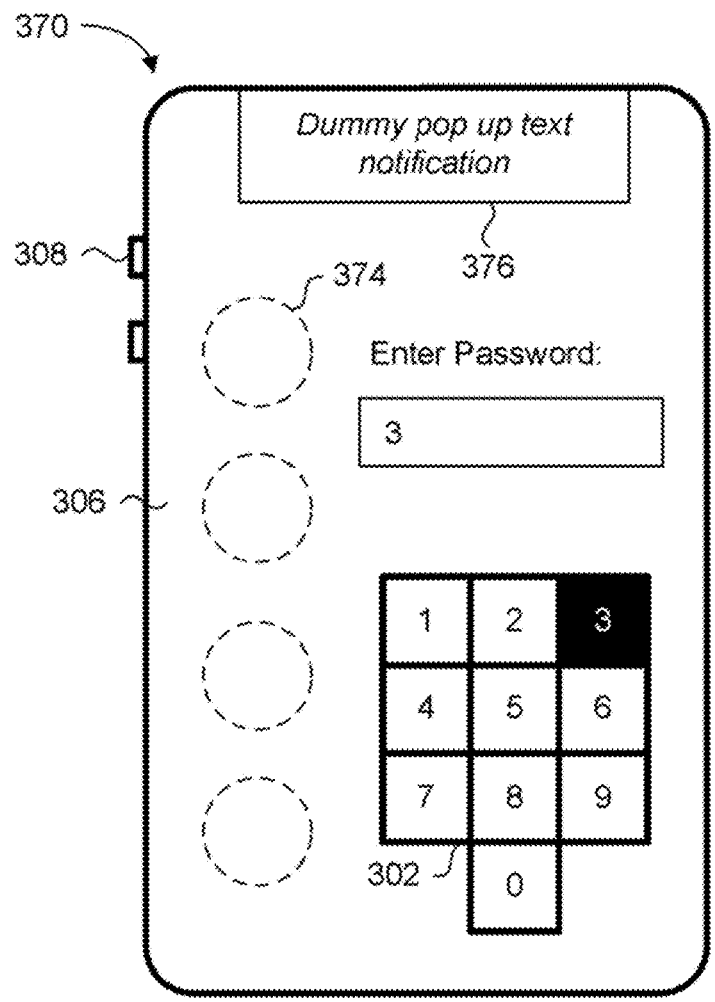
FIG. 11 is a diagram of a mobile device having a graphical context input interface, according to a further embodiment.

The embodiment of FIG. 11 shows a mobile device 370, similar to the generic mobile device 300 shown in FIG. 6, where the same reference numbers correspond to the same previously described features. In the embodiment of FIG. 11, individual context input interface regions 374 are provided on the touchscreen display 306 which are similar to the context input interface swipe area 354 in the embodiment of FIG. 10, except each of the context input interface regions 374 are distinct from each other. The context input interface regions 374 are shown as circles, but can be of any shape and size. The user is aware of their general location on the touchscreen display 306, and the present example shows four selectable contexts. To provide an indication of the selected context when a particular context input interface region 374 is selected, a context feedback interface consisting of a distinct dummy pop-up message 376 similar to email or news notifications can be graphically presented on an area of touchscreen display 306. For the embodiment of FIG. 11, another person may not realize that a context is being selected as the dummy pop-up message 376 disguises the context selection. The user can configure specific dummy messages for each selectable context, and is thus aware of the selected context. Alternate to dummy messages, small images, pictures or graphics can be displayed for each context instead.

In the present embodiment of FIG. 11, an advantage of the top-to-bottom linear arrangement of input interface regions 374 is that a user holding the mobile device 370 in a left hand can use their thumb to discretely select a context by touching/sliding over one of the input interface regions 374. The input interface regions 374 can be configured to be positioned on the right side of touchscreen display 306 instead, for operation by the right hand thumb. In an alternate embodiment where there are more contexts available than there are corresponding input interface regions 374, the input interface regions 374 can be sized and spaced such that concurrent selection of two adjacent regions 374 results in a different context selection. In the presently shown example, this would allow for three extra context selections as the top pair, middle pair and bottom pair of regions 374 can be concurrently selected by a user's thumb. The mobile device 370 can be configured such that a constant touch of one or a pair of input interface regions 374 is required for selecting a context. Alternately, a single touch can set the context for keypad input interface 302.

In the previously described embodiments, context selection is done by way of user interaction with the touchscreen display 306. Programming a touchscreen display to present graphical information, to set regions or areas for detecting a touch or a swipe, and to use the signaling information resulting from such detected touches or swipes to actuate further processes such as changing the display to show the selected context, should be well known to those skilled in the art. Those skilled in the art understand that application development kits are available to enable creation of applications, and can use such development kits to program the embodiments of the password authentication system.

It is well known that some mobile devices have integrated accelerometers to sense the orientation, pitch and rotation of the mobile device relative to ground. Therefore according to alternate embodiments, context selection can be made by changing the orientation of the mobile device in any one or more of the three dimensions. Therefore, the accelerometer system is another context input interface which can be configured for use with the presently described embodiments of the password authentication system.

Figure 12:
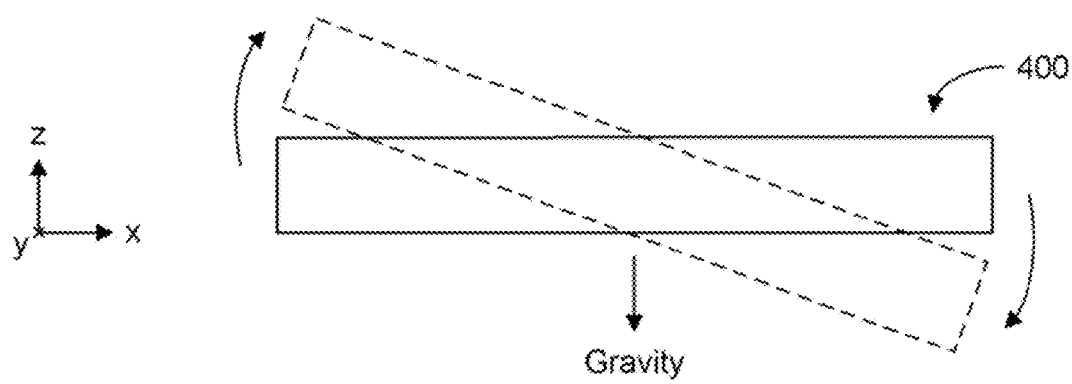
FIG. 12 is a bottom view of a mobile device using an accelerometer system as a context input interface, according to one embodiment.

FIG. 12 shows a bottom view of a mobile device 400 using an accelerometer system as a context input interface. The orientation of the drawing in FIG. 12 is as follows. The vertical axis is the z-axis normal to a plane of the ground. The x-axis extends perpendicular to the z-axis in the left-right direction of the page, and the y-axis extends perpendicular to the z-axis into the page and perpendicular to the x-axis. It is assumed that gravity exerts a downward force in the z-axis on the mobile device 400 as shown by the arrow in FIG. 12. The mobile device 400 can rotate about the y-axis and can pitch forward or backward relative to the x-axis. Pitching forward and backwards is similar to a rotation about the x-axis. FIG. 12 shows an example of the mobile device 400 rotating, or tilting, in dashed lines relative to the original position co-planar with the ground. Both rotation and pitch of the mobile device 400 can be affected by the user's hand which holds the mobile device. The pitch and/or rotation can be sensed to change the context of the keypad input interface. In one embodiment, each of a forward pitch, a backward pitch, a left side rotation and a right side rotation can set a corresponding context. Alternately, any pitch or rotation can toggle from context to the next context. Other sensors built-in to the mobile device 400 can be configured in the same manner to trigger selection of a context, or to toggle from one context to another context.

Figure 13:
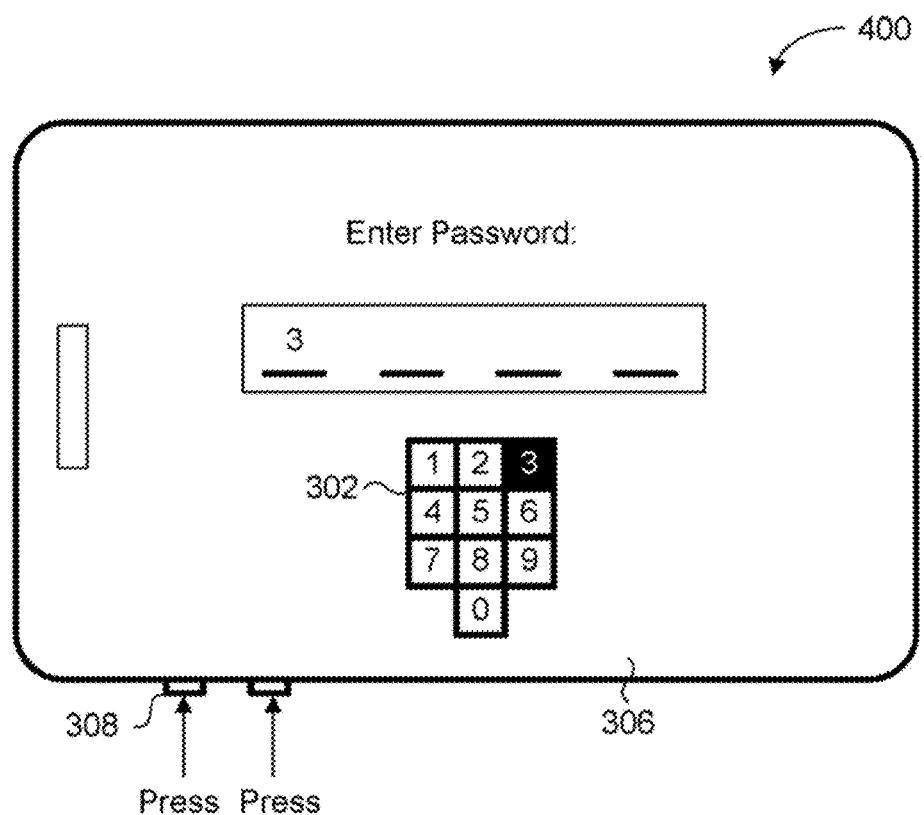
FIG. 13 is a plan view of a mobile device using an accelerometer system as a context input interface, according to another embodiment.

FIG. 13 illustrates another embodiment where changing the orientation of the mobile device 400 from a portrait orientation to a landscape orientation can toggle or select between contexts for keypad input interface 302. Again, the accelerometer system of the mobile device 400 can be configured to be used as the context input interface for the presently described password authentication system. It is assumed for the embodiment of FIG. 13 that the keypad input interface 302 is an on-screen keypad whose orientation remains the same when the orientation of the mobile device 400 changes. Changing the orientation between portrait, rotating the orientation left and rotating the orientation right, can each select a different context for keypad input interface 302. Alternately, any change in orientation of the mobile device 400 toggles from one context to the next context. For mobile devices where the keypad input interface 302 is physical, the keypad would still be functional to allow key presses.

Another context input interface for selecting a context includes any dedicated hardware buttons for the mobile device 400. By example, many mobile devices have dedicated hardware buttons, such as the volume up and volume down actuation buttons. These dedicated buttons can be reconfigured in the present password authentication system embodiments to select a context in two different ways. In a first method, each dedicated button can select one specific context; therefore two contexts are selectable with the two buttons. In a second method, each button can toggle a different context in different directions. For example, the volume up button can toggle up to the next context, while the volume down button can toggle down to the previous context in the predetermined order of contexts. Accordingly, dedicated function button sensors and accelerometers are examples of types of physical sensors which can be used as a context input interface.

Figure 14:
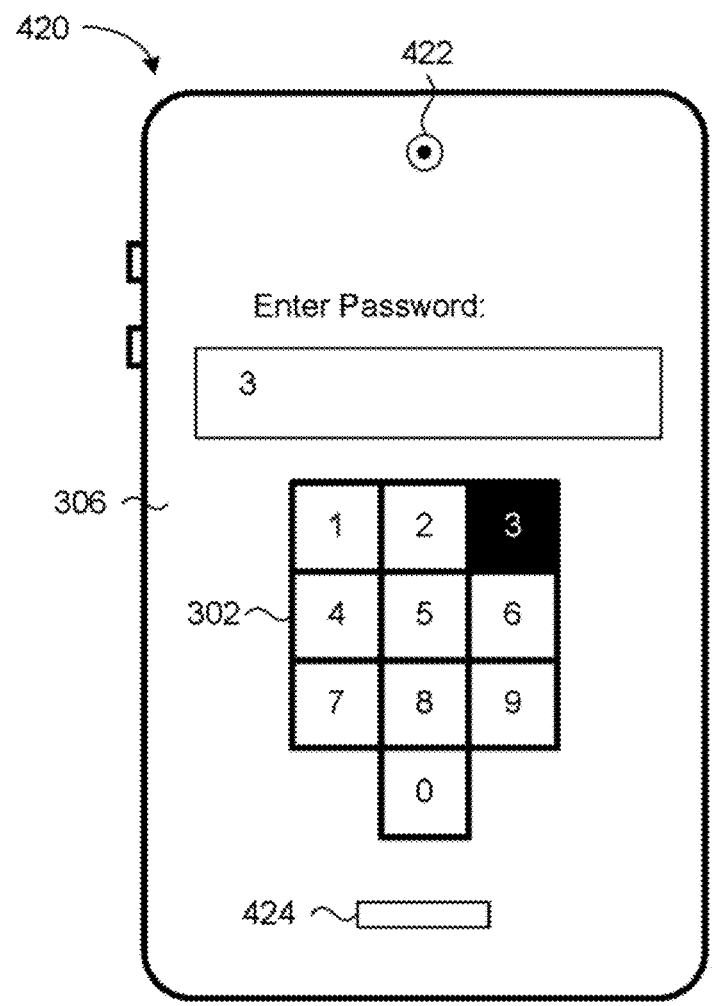
FIG. 14 is a diagram of a mobile device having biometric context input interface, according to a present embodiment.

According to another embodiment, other examples of physical sensors include biometric sensors, which can be used to toggle or select contexts for the keypad input interface. As shown in the embodiment of FIG. 14, the mobile device 420 includes a camera 422 and a fingerprint sensor 424. In the following described embodiments, it is assumed reference image data for each eye or fingerprint for the user has been pre-stored in the mobile device 420, where each unique image data can correspond to selection of a specific context.

In one embodiment, the camera 422 can be activated during the password authentication process to capture all or specific features unique to either the left or right eye of the user. In use, the user aligns the camera 422 with a specific eye for a short duration of time required by the mobile device to capture an image. This image is compared against pre-stored reference images, and when a match is determined, one context is selected. Alignment of the other eye with the camera 422 can result in selection of a different context, provided the new image data matches one of the pre-stored reference images. Those skilled in the art understand that various algorithms are available for detecting eye features for the purposes of matching to reference information, which can be used in the present embodiments to trigger selection of different contexts.

In a variation to this embodiment, visual object detection software for camera 422 can be configured to detect if the user looks at specific areas of the touchscreen display 306. For example, looking at each of the four corners of the display can select a different context, or looking at one display area can toggle to the next context and looking at another display area can toggle to the previous context. Similar to the previously described embodiment, algorithms are known in the art for detecting eye movement, which can be used in the present embodiments to trigger selection of different contexts.

According to another embodiment using the camera 422, facial scan data can be used to select or toggle context. For example, different orientations of the face can be used to select a particular context, where partial left and right profiles, up and down tilts and full frontal view of the face can each select or toggle a different context. Once again, reference images for the user's face in these different orientations have been previously captured and stored on the mobile device. Those skilled in the art will appreciate that facial recognition algorithms are known in the art, which can be used in the present embodiments to trigger selection of different contexts.

In another embodiment, the fingerprint sensor 424 can be activated during the password authentication process to capture all or specific features unique to any number of fingers of the user. Similar to the camera embodiment, matches of the scanned fingerprint to a pre-stored reference fingerprint will select a specific context. The advantage here is that most users have 10 distinct fingerprints, thereby allowing selection of up to 10 different contexts. In an alternate embodiment, scanning one fingerprint can simply toggle to the next context and scanning a different fingerprint can toggle to the previous context. Those skilled in the art will appreciate that fingerprint sensor control and recognition algorithms are known in the art, which can be used in the present embodiments to trigger selection of different contexts.

One of the advantages of the embodiments using biometrics to change context, is that the biometric reference data is unique to a particular user. Therefore, only users authorized to use the device can successfully enter a password. This feature allows for sets of image data to be stored for different users, allowing multiple authorized users to access the same device. In the previously described embodiments where biometric sensors are used, the user has the option of optimizing match detection sensitivity and speed of detection. For example, a user more concerned about security may require higher match detection sensitivity which may involve comparisons of a high number of received data points to the reference data and thus require more time for a match to be detected. On the other hand, a user less concerned about security may require high speed match detection sensitivity which may involve comparisons of just a small number of received data points to the reference data. Such optimization can be presented to the user via a user interface of an application executed on the mobile device.

In the previously described embodiments, context selection is done by sensing physical actuation or user movement or manipulation of the electronic device using existing hardware components of the electronic device. The password authentication system embodiments can be configured to recognize the signals provided by physical button sensors, accelerometers, other physical sensors or software such as visual object detection software, to trigger context selection or change. Those skilled in the art understand that application development kits are available to enable creation of applications, and can use such development kits to program the embodiments of the password authentication system.

In the previously described embodiments, feedback of the selected context was done by way of the user interaction with the touchscreen display. Most mobile devices have speakers to provide sound, and are switchable to a vibrate mode to provide haptic feedback for an alert that would otherwise be audibly provided through the speakers.

Figure 15:
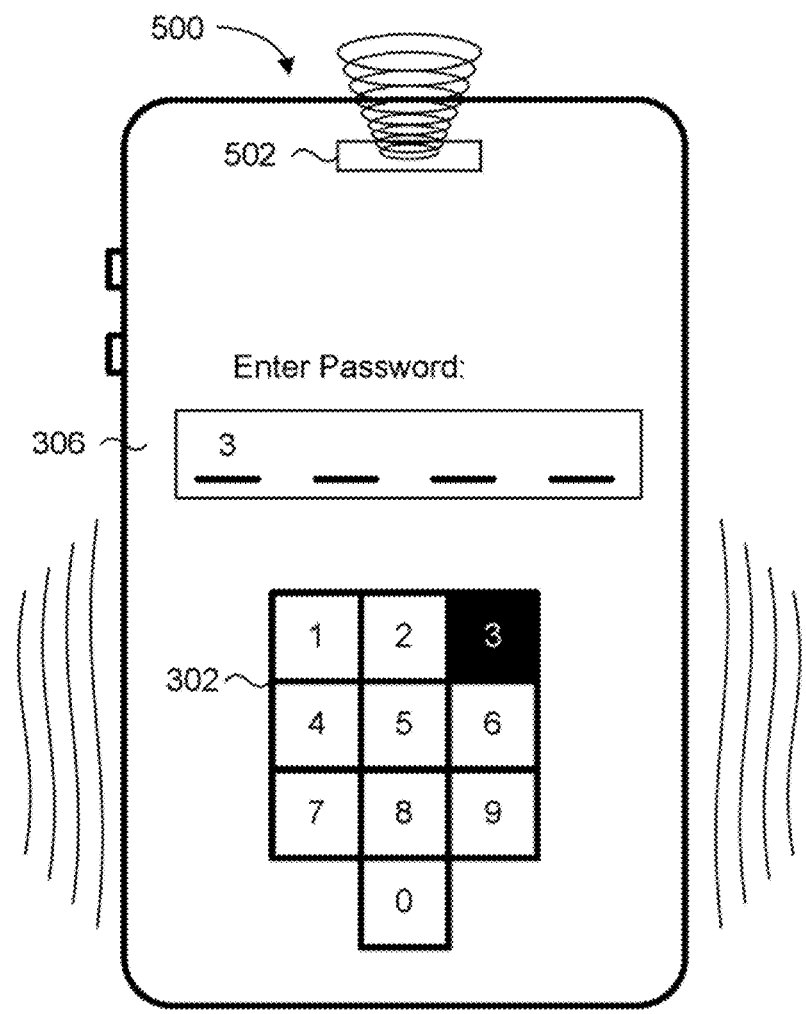
FIG. 15 is a diagram of a mobile device configured to provide physical feedback of a selected context, according to a present embodiment.

As shown in the embodiment of FIG. 15, the mobile device 500 is configured to use any one of its built in speakers 502 to provide an audio alert indicating that a specific context has been selected, via any of the previously described context input interfaces. Each alert can be a distinct audio sound corresponding to a specific context. The mobile device 500 can be configured to use the integrated haptic feedback system (not shown) to actuate in response to any of the previously described context input interfaces, thereby providing physical feedback of a selected context. For this embodiment, specific vibrating patterns can be associated with each context. Accordingly, audio and vibration systems of the mobile device are examples of physical context feedback interfaces which can be used for the password authentication system of the present embodiments.

The password authentication system embodiments can be configured to control the audio and haptic feedback systems to provide physical feedback of a selected context. Those skilled in the art understand that application development kits are available to enable creation of applications, and can use such development kits to program the embodiments of the password authentication system.

The previously shown embodiments have illustrated various examples of key input interfaces, context input interfaces, and context feedback interfaces. To summarize, context input interfaces can include graphical, physical and sensor based systems to change the context of a key input interface. Context feedback interfaces can include graphical and physical systems to provide the user some indication of the selected context. In various embodiments, different graphical and physical context input interfaces can be mixed and used in conjunction with each other. Similarly, different graphical and physical context feedback interfaces can be mixed and used in conjunction with each other. A mixed use of graphical and physical context input and context feedback interfaces will make it more difficult for another person to detect and duplicate context selection corresponding to a selected key press.

Figure 16:
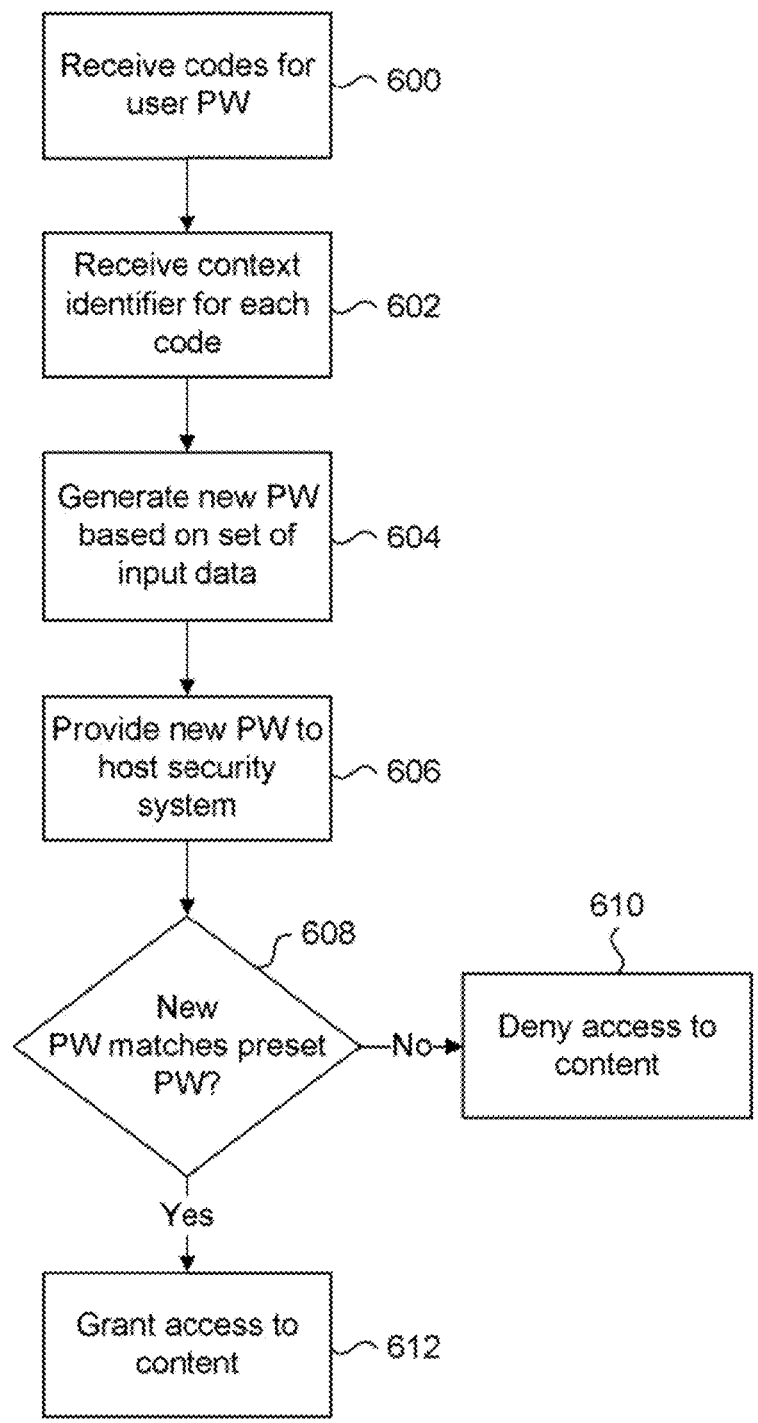
FIG. 16 is a flow chart of a password authentication method, according to a present embodiment.

A simplified summary of the operation of the present password authentication system is now provided with reference to the flow chart of FIG. 16. This method can be executed by any electronic device where access to content is obtained through entry of a password, such as the mobile devices shown in the previous embodiments. It is assumed that a user can select keys and contexts for each selected key entry using a suitably configured device similar to the mobile devices shown in the previous embodiments. The method starts at 600 where the electronic device receives key codes corresponding to selected key presses. For each code, a selected context identifier is also provided at 602. Each pairing of a key code and its corresponding context identifier can be referred to as input data. At 604, a new password is generated based on the received input data corresponding to the user entered password and contexts selected. This new password has no direct correlation to any of the originally selected key presses. In other words, discovery of the machine code of the new password would not result in the originally selected key presses either directly or indirectly as they have been transformed through the context functions.

Once the new password is provided to a host security system at 606, the host security system compares the received password to the preset password at 608. The host security system can reside and be executed on the electronic device or on a web server. It is assumed that the preset password has been previously set by the user using the same password encoding steps 600, 602 and 604. If at 608, the new password and the preset password mismatches, then the method proceeds to 610 where some feedback is provided to the user that access to content is denied. From 610, the method can return to 600 to repeat the password entry. Otherwise, a match determined at 608 results in granting of content to the user at 612. This can include unlocking the electronic device, or gaining access to a web-based account for example.

As previously shown, the mobile devices have various components which can be configured for use with the presently described password authentication system embodiments. Following is a description of a typical mobile computing device configured to include the password authentication system of the presently described embodiments, and more specifically a system for generating passwords with contextual key inputs.

Figure 17:
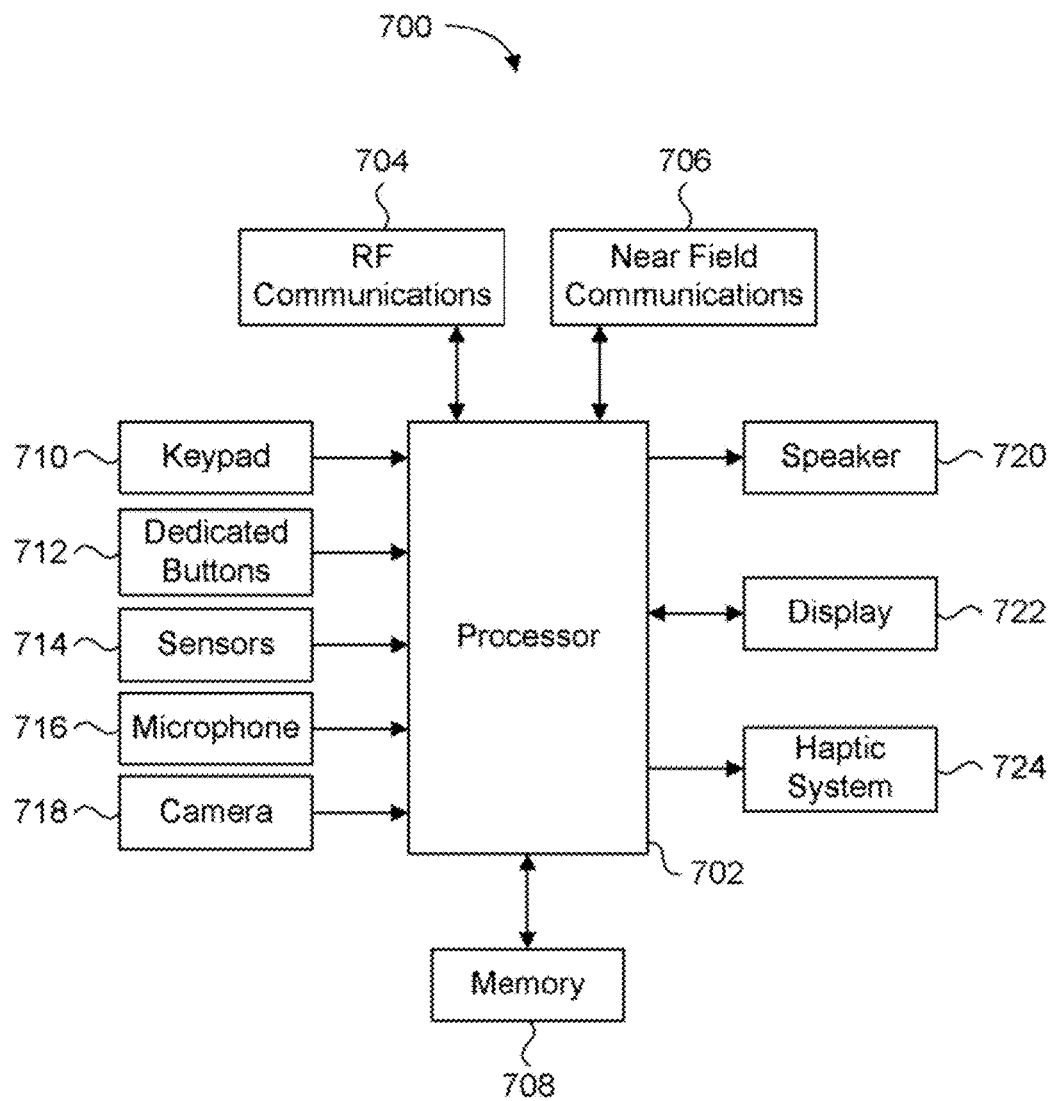
FIG. 17 is a block diagram showing functional hardware components of a mobile device configured to include the password authentication system of the present embodiments.

The mobile device 700 of FIG. 17 includes a number of components such as a processor 702 that controls the overall operation of the mobile device 700. Communication functions, including data and voice communications, are executed through an RF communications block 704, including for example a radio frequency transceiver configured to operate with the Global System for Mobile Communication (GSM) and General Packet Radio Services (GPRS) standards, by example. A near field communications block 706 provides Wi-Fi, Bluetooth and any other short range broadband wireless communication capability. The processor 702 has access to memory 708, which can include both volatile and non-volatile memory for storing program/application data and user data, including preset passwords for unlocking the mobile device, for unlocking an application on the mobile device or for accessing locally stored accounts.

The mobile device 700 can have several user input systems which are used to initiate an action or process by the processor 702. For example, a physical keypad 710 enables entry of characters for a password, or for composing text messages. A key encoder can be included for generating codes corresponding to each key press. Dedicated buttons 712 such as volume up and volume down prompts the processor 702 to change the volume level of a speaker, by adjusting an internal speaker amplifier by example. A variety of sensors 714 for sensing the environment of the mobile device can be provided. Accelerometers can be used to detect the orientation and pitch of the mobile device, allowing users to play games and control movement of an avatar without having to press keys. A light sensor can be used to automatically dim or increase screen brightness to optimize viewing comfort. A fingerprint sensor and other biometric sensors can be included as well. A microphone 716 is typically included for enabling voice communications, and a camera 718 enables video or image capture. While the list of input systems is not exhaustive, any type of input system which can detect a user's physical action to set a context without having to select a key of the keypad 710 can be incorporated into the programming of the password authentication system embodiments. Examples of using accelerometers and dedicated buttons to change the context of the keypad 710 have been previously described.

The mobile device 700 can have several device feedback systems which can be configured to provide an indication of a context selected via any one or more of the previously mentioned input systems. A speaker 720 is provided mainly for providing audio for voice communications, or sound when playing back multi-media content. A touchscreen display 722, or a touch-sensitive display, functions as both an input system and a graphical display. A haptic system 724 can be included to provide physical notifications of alerts, such as vibrations of the chassis of the mobile device. While the list of feedback systems is not exhaustive, any type of feedback system which can provide some indication of a selected context can be incorporated into the programming of the password authentication system embodiments. Examples using the speaker 720, display 722 and haptic system 724 (vibration) to provide an indication of the selected context have been previously described. In other embodiments, indication of a selected context can be provided through connected devices such as wearables and smart watches.

Mobile devices typically include an operating system and software program components stored in memory 708 and executed by the processor 702. Those skilled in the art will appreciate that portions of the operating system and the software program, such as specific device applications, or parts thereof, may be temporarily loaded into a volatile memory. The operating system can be modified to integrate the presently described password authentication system, or components thereof, such as password entry with context information for example. More specifically, as the operating system controls the aforementioned user input systems and the device feedback systems, the operating system can be modified to temporarily use them for context selection and to provide corresponding feedback indication.

Now that techniques and mechanisms to select contexts for a key input data and for providing user feedback have been described, a discussion of how the key press data (key code and context identifier) can be used now follows.

Figure 18:
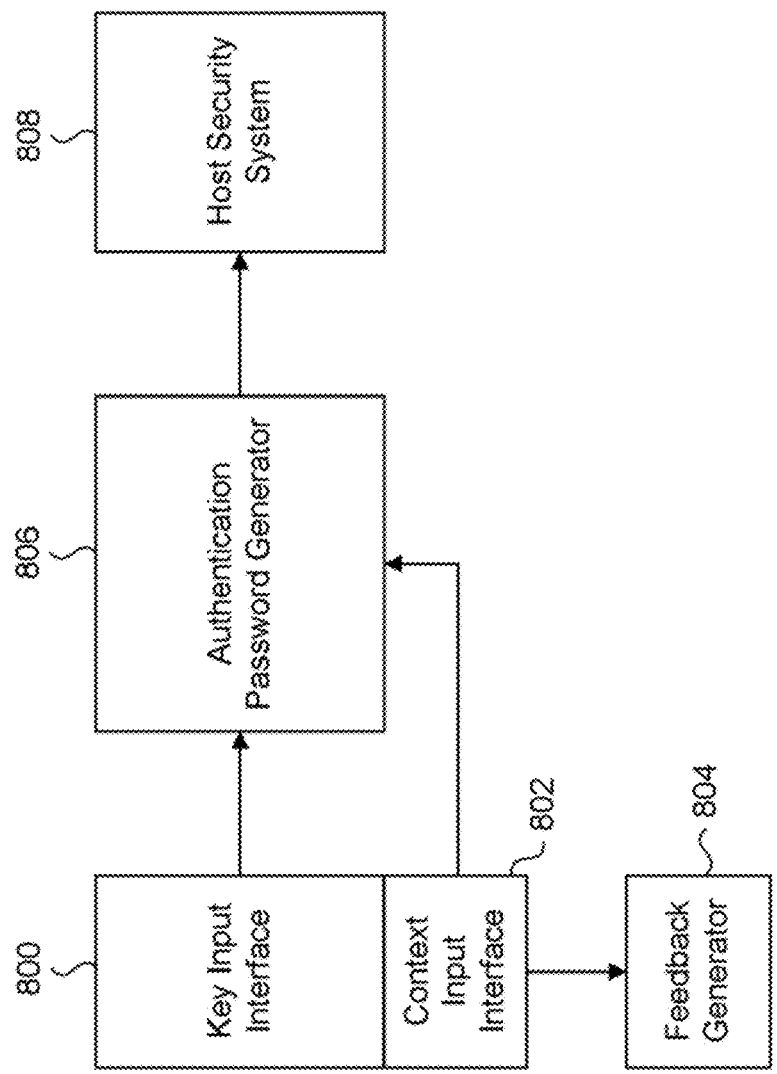
FIG. 18 is a general block diagram of the password authentication system, according to a present embodiment.

FIG. 18 is a general block diagram of the password authentication system, according to a present embodiment. The system includes a key input interface 800, context input interface 802 and a feedback generator 804, all of which can be implemented in the mobile device 700 of FIG. 17, or any other electronic device. These components have been described at length in the previous embodiments. The system further includes an authentication password generator 806 and a host security system 808, both which can reside in the electronic device. Alternately, the authentication password generator 806 can reside in the electronic device or both the authentication password generator 806 and the host security system 808 can reside in another system, such as a web-based server for example. The authentication password generator 806 provides a new password based on received key codes and corresponding context identifiers (input data). The host security system 808 compares a received password with a preset password to grant or deny access to content. The host security system 808 can be integrated with a local application residing on the electronic device, or the web-based server.

In operation, a context is selected via context input interface 802 and the feedback generator 804 provides feedback indicating the selected context. A key is selected via key input interface 800, and both a key code and a corresponding context identifier (input data) are provided to the authentication password generator 806. Once the entire password is entered, the authentication password generator 806 transforms the received input data into a new password having no direct or indirect relation to the selected keys. This transformation can be effected by way of application of a context function, as shown by the example embodiment of FIG. 5B. The new password is provided to the host security system 808 which either grants or denies access to content after comparing the new password to the preset password.

Figure 19:
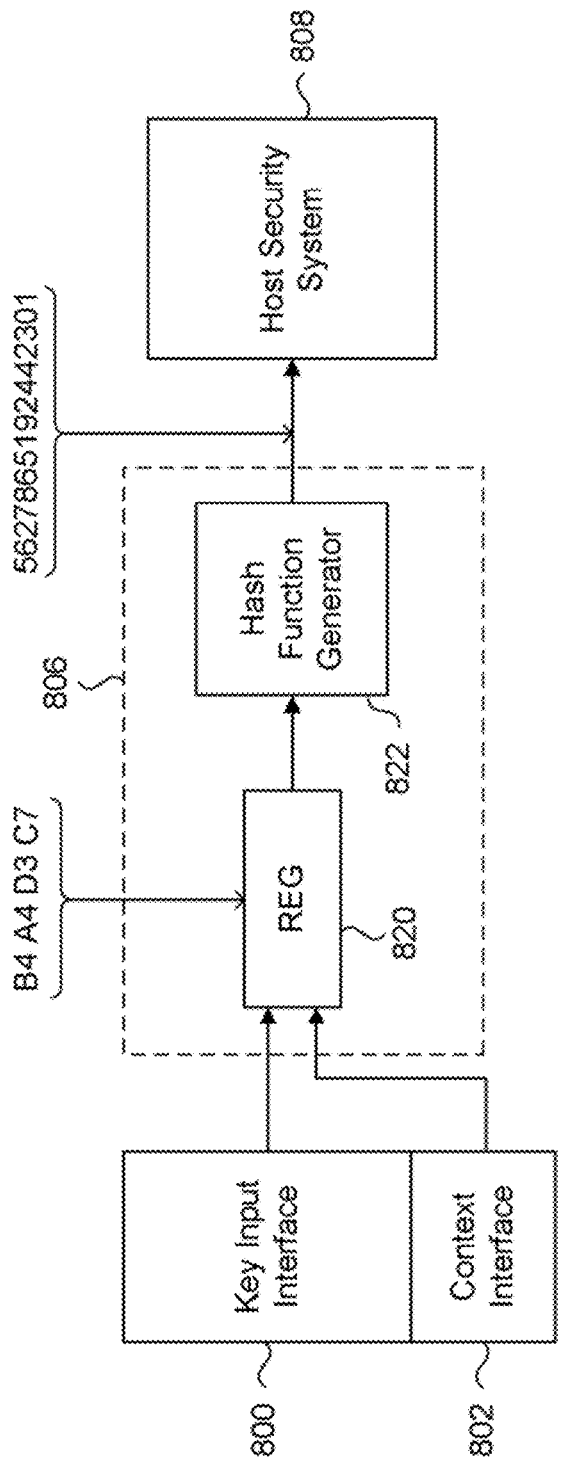
FIG. 19 is a block diagram of the system of FIG. 18 configured to generate a new password based on a user entered password, according to one embodiment.
Figure 20:
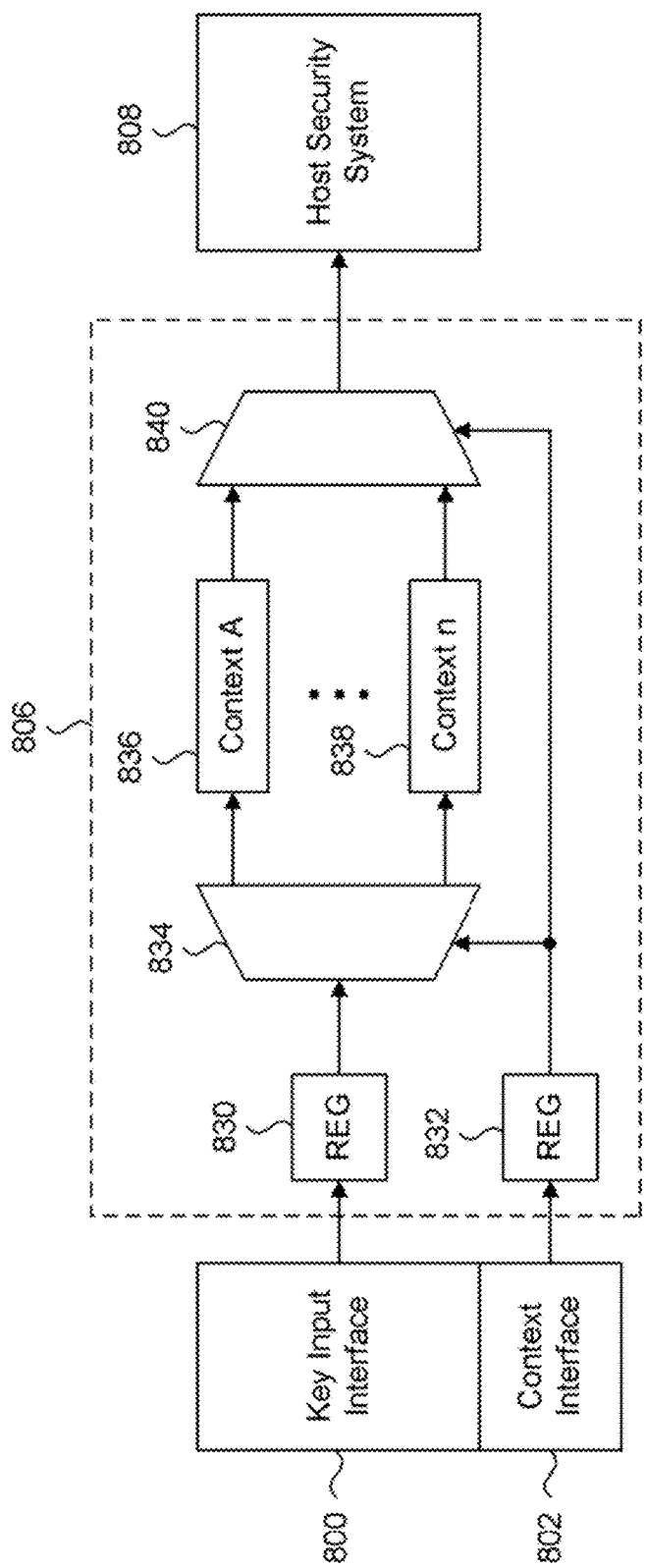
FIG. 20 is a block diagram of the system of FIG. 18 configured to generate a new password based on a user entered password, according to another embodiment.

Embodiments of how the password input data, including key codes and corresponding context codes, are transformed into a new password within the setting of the system of FIG. 18 now follows with reference to the embodiments of FIGS. 19 to 20.

FIG. 19 shows an embodiment of the password authentication system configured to generate a new password based on a user entered password. The same numbered components have been previously described in FIG. 18, and the feedback generator 804 of FIG. 18 is not shown in order to simplify the drawing. In the present embodiment, the authentication password generator 806 can include a register 820 and a hash function generator 822. The register 820 stores key codes from the key input interface 800 for selected key entries, and context identifiers corresponding to each selected key entry. It is noted that some host security systems allow for passwords having a minimum and a maximum length. Therefore, the selected key entries are stored until the user indicates, via a confirmation key on the key input interface 800, that the password key selections are complete. Thus the register 820 temporarily stores the password key selections. Other host security systems impose passwords of a fixed length, such as four characters for example, and automatically receive the selected key entries after the last character has been selected. Once again, the register 820 can be used to temporarily store, or buffer, the selected key entries. The register 820 can be implemented using any hardware memory of the electronic device according to well-known methods in the art.

In the example of FIG. 19, it is assumed that key press data of "B4", "A4", "D3" and "C7" are stored in register 820, where the letters represent context identifiers and the numbers represent selected key codes within the selected context. It is assumed that each context identifier and each key code are represented by unique binary values. The input data are provided to hash function generator 822, which is configured to encode the input data according to well-known algorithms, such as the SHA-2 or bycrypt hash algorithms for example. With reference to the embodiment of FIG. 5B, such encryption can be executed upon the assembled Authentication Password. Alternately, such encryption can be executed earlier upon the individual Authentication Password Segments. In a further alternative, encryption can be executed on just a single segment, for assembly later into the new password with the non-encrypted Authentication Password Segments. Any hash algorithm can be coded in hash function generator 802, which would be an application executed by the processor of the electronic device. In the present example, the hash function generator 822 generates a new password corresponding to a character string of "5627865192442301". The new string includes digits from which one cannot recover the original selected key entries of "4437" in any way. Therefore, even if another user discovered the original selected key entries of "4", "4", "3" and "7", without the context codes corresponding to each selected key entry, it is very difficult for the other user to access the content. One advantage of the present embodiment is that the user can easily remember a short length password, while a longer and hence more secure password is automatically generated for use with the host security system 808.

In applications where the host security system 808 requires a fixed length password, the hash function generator 822 can be configured to generate a new password having the same fixed length. It is assumed that the hash function generator 822 is configured to generate codes corresponding to the valid set of codes acceptable by the host security system. For example, if special characters are not accepted, then the hash function generator 822 is configured to exclude those corresponding codes.

FIG. 20 shows an embodiment of the password authentication system configured to generate a new password based on a user entered password. The same numbered components have been previously described in FIG. 18, and the feedback generator 804 of FIG. 18 is not shown in order to simplify the drawing. In the present embodiment, the authentication password generator 806 can include a key code register 830, a context identifier register 832 and a context mapper. The context mapper functionally includes an input selector 834, and one or more context functions 836 and 838, and an output selector 840. Key code register 830 receives and stores the key codes corresponding to each selected key entry, and context identifier register 832 stores context identifiers corresponding to each key code. Both registers can be implemented using any hardware memory of the electronic device according to well-known methods in the art.

The input selector 834 is functionally shown as a demultiplexor for passing an input to one of at least two outputs in response to control signals, as is well known in the art. In the present embodiment, a context identifier from context identifier register 832 can be passed to any one or more outputs of selector 834 in response to the corresponding context identifier from context identifier register 832. The context functions 836 and 838 convert a received key code into a different valid key code, where the context functions 836 and 838 differ from each other and from the original key code. Examples of context functions that produce different mappings for the key codes were previously shown in FIG. 7. These mappings can be stored in any hardware memory of the electronic device and accessible using known methods in the art. Any number of different context functions can be included as long as the context identifier can select any one of them using input selector 834. The output selector 840 is shown as a multiplexor for passing any one of the inputs to a single output in response to control signals, as is well known in the art. In the present embodiment, a remapped key code from context functions 836 and 838 can be passed to the single output of output selector 840 in response to the same context identifier received by input selector 834. With reference to the embodiment of FIG. 5B, the previously described context mapper can correspond to 262 and 264, except that the context function 262 is a remapping of key codes instead of concatenation of a Context Code with a Key Code In both the embodiments of FIGS. 19 and 20, the authentication password generator 806 converts the key code corresponding to each key entry and the context identifier corresponding to a selected context for each key code, into a new authentication password having no correlation to the key codes of the key entries. While FIGS. 19 and 20 illustrate specific examples of how the authentication password generator 806 generates a new password from a user entered password, any type of encoding scheme can be employed by authentication password generator 806 to convert or transform the key codes and the corresponding context identifiers of a user entered password into a new password.

The embodiments of the password authentication system have been described as example implementations on a portable or mobile electronic device, such as a smartphone or tablet. The present embodiments can be implemented on a computer workstation or laptop. For a computer workstation, the context input interface can include any input other than the physical keyboard. For example, different buttons of a mouse or pointer interface can select different contexts for the keyboard, or toggle to different contexts. A touch pad of a laptop computer can be used to detect touch swipes for changing contexts of the keyboard. Once again, any input other than an input that is used to enter a valid password key entry can serve as the context input interface.

The presently described password authentication system embodiments may be used in various software security applications, which require generation of a password for authentication purposes. For example, the presently described embodiments can be used in conjunction with commonly owned U.S. Pat. Nos. 8,510,811, 8,468,582; U.S. patent application Ser. No. 13/913,399 filed on Jun. 8, 2013; and U.S. patent application Ser. No. 13/765,049 filed on Jun. 8, 2013, all of which are incorporated herein by reference.

For example, a method for authenticating a security device at a local network location for providing a secure access from the local network location to a remote network location may be provided, having the following steps:

at the security device, having a global unique identifier (UID), a processor and a memory: obtaining, from the remote network location, a private security software, and causing the private security software to obtain:

a password comprising a sequence of keys selected from one or more key pads, each key pad having a unique context identifier and comprising a number of keys, each key having a unique key code, the password comprising key codes and context identifiers of the selected keys; and the UID of the security device, the UID uniquely identifying the security device and being permanently associated with the security device;

generate an authentication password by applying a cryptographic function to the user selectable password;

forwarding the authentication password, the UID and the private security software to the remote network location for generating a user-personalized credential code using the authentication password, the UID and the private security software, comprising encrypting the user-personalized credential code;

at the security device, obtaining the user-personalized credential code from the remote network location, and verifying the authentication password and the UID, without communicating over a network, comprising decrypting the user-personalized credential code; and retrieving access credentials to the remote network location upon verifying the authentication password and the UID.

In the previously described embodiments, the various biometric inputs were used for switching or selecting a context within which the user selects different keys for entry of a password. In a variant of those embodiments, each valid biometric input of the user can be equivalent to a key press that generates key code data. In other words, a combination of at least one key press and at least one biometric input can be provided by the user. Using a combination of biometrics and a key press for password entry is advantageous if the biometric scanner or detector sensitivity/accuracy alone is insufficient for authenticating a valid user, due to, for example, low lighting conditions when performing facial scans. In such an embodiment, different valid biometric inputs generate corresponding unique key press data. For example, each of the user fingerprints generates different key press data which are preprogrammed as valid reference key press data in the password authentication system.

Figures 21A, 21B, 22:
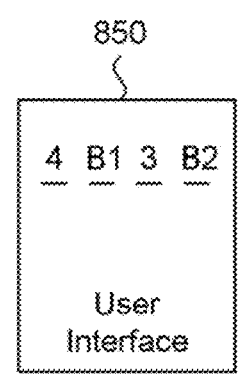
FIG. 21A is a table showing an example mapping of key code data and context identifier data for different key press inputs and biometric inputs, according to a present embodiment.
FIG. 21B is a table showing an alternate example mapping of key code data and context identifier data for different key press inputs and biometric inputs, according to a present embodiment.
FIG. 22 is an example illustration of key press and biometric inputting of a password via a user interface, according to a present embodiment.

Alternately, each key press of a key generates key code data for that key and default context identifier. Then each valid biometric input generates key code data corresponding to any existing valid key and new context identifier different from the default context identifier. In one embodiment, all valid biometric inputs generate the same key code data, but different context identifiers, as shown in the example of FIG. 21A. FIG. 21A is a table showing an example mapping of key code data and context data for different key press inputs and biometric inputs. Each key press data has different key code data, but have the same default context identifier. However, each of the three biometric inputs is assigned the same key code data for key press input "1", but have different context identifier.

In another embodiment, each valid biometric input generates different valid key code data, and different context identifier, as shown in the example of FIG. 21B. Each key press data has different key code data, but have the same default context identifier. However, each of the three biometric inputs is assigned different existing key code data, and each have different context identifier.

If on the other hand the key code data is programmable, then all key press and biometric inputs can have distinct key code data. In this embodiment different contexts are selectable for each key press, as described in the earlier embodiments. However, a context can be selected for each biometric input to further enhance security if the biometric scanning sensitivity or accuracy is compromised for scanning speed. If the biometric scanner is capable of high sensitivity or accuracy, then the biometric input can generate pre-assigned context identifier along with its key code data.

FIG. 22 is an example illustration of a set sequence where a 4 digit or character password is required for accessing content via a user interface 850. In this example, it is assumed that the first entry is "4", the second entry is a biometric input "B1", the third entry is 3 and the fourth entry is another biometric input "B2". Biometric inputs B1 and B2 can both be of the same type, such as different fingerprints, or they can be of different types, such as a fingerprint and eye inputs by example. The password authentication system can be configured to accept any number of inputs. Therefore for each key press and biometric input, key and context data is generated for further processing as illustrated in the embodiment of FIG. 4 by example. According to alternate embodiments, the system is configured to accept all inputs as biometric inputs.

In the above example, the mobile device fingerprint scanner is enabled during the password authentication process so that the mobile device can receive both key presses and detected fingerprint scans, in any combination of sequences. For other types of biometric inputs, such as facial or cornea detection, an existing physical button of the mobile device or other virtual button on the touchscreen can be configured to turn on the camera or capture an image when actuated. This ensures that image capture is performed by the camera at the correct time either before or after a key press. In the previously described biometric input embodiments, an invalid biometric input has the same effect as an incorrect key press, and access to content is denied.

Figure 23:
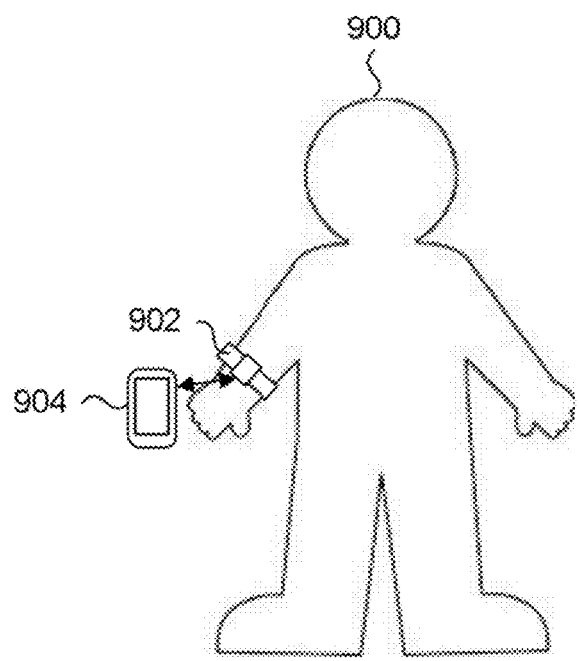
FIG. 23 is an illustration of a user wearing at least one portable sensor for setting a context of a mobile device, according to a present embodiment.

The above described biometric inputs are not limited to facial image, cornea image or fingerprints. Other types of biometrics can be used to provide an input to the password authentication system embodiments. For example, heart rate sensors, temperature sensors, and future sensors which can detect unique biosignatures of humans can be used. For example, the unique skin flora and acidity levels of perspiration are possible biometrics which can be used. FIG. 23 shows a generic example of a person 900 wearing at least one portable sensor 902. The portable sensor 902 can be configured to sense heart rate, temperature and other biometric signatures detectable simply by contact with the skin. The portable sensor 902 includes some form of wireless near field communications (NFC), such as Bluetooth for example, to allow transmission of the sensed biometric data to a mobile device 904.

The use of more than one portable sensor 902 for detecting different biometrics increases the distinctive biosignature of the person 900 relative to others. By example, temperature sensing may be more effective if taken at different locations of the person 900. It is also contemplated that a single portable sensor 902 can detect more than one type of biometric of the person 900.

During password authentication, the person 900 can make key presses from the keyboard and actuate the mobile device to sample the biometric signal from the portable sensor 902 at the appropriate time, as another key press entry. This is due to the fact that the biometric signal may be provided continuously, and thus the appropriate time to sense or process the signal by the mobile device 904 is required to ensure it is "entered" in the proper sequence of the user defined password. Therefore, content of the mobile device 904 is very difficult to access by anyone other than the authorized person 900 because the unique biometric information for the authorized person 900 would not be available.

The previously described embodiments illustrate how different contexts can be selected by the user for generating passwords which are difficult for unauthorized users to discover. These previously described contexts can be referred to as local contexts of the mobile device, in that access to the content of the mobile device is available anytime and anywhere.

According to a present embodiment, external contexts can be used for enabling access to the mobile device only in specific areas, times or dates for example. Such external contexts are passive, in that user interaction with the mobile device is not required for selecting the context. It is noted that in the previously described embodiments, direct user interaction for setting contexts is required. With external contexts on the other hand, the context is automatically selected for the password authentication system based on sensed parameters by the mobile device. The sensed parameter can be a signal, code or data, for which the mobile device is configured to compare to a predetermined reference signal, code or data. A match triggers the correct context to be set by the mobile device. When the user enters a valid password sequence, the same context data is provided with each key press data. On the other hand, any mismatch between the sensed parameter and the reference signal or code maintains the default incorrect context. It is assumed that a particular sequence of key presses with the correct context data has been preset as the correct password.

Figure 24:
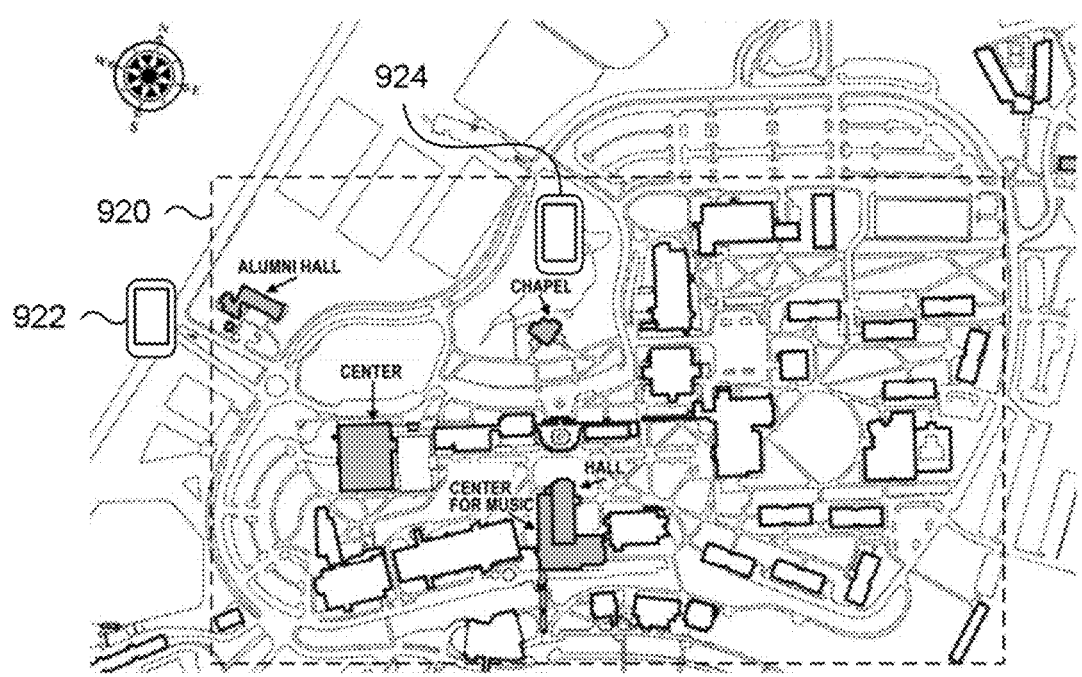
FIG. 24 is an illustration of an example of a geographic context, according to a present embodiment.

FIG. 24 is an example of one type of external context, referred to as geographic context where the location of the mobile device provides a specific context data for each key press data. In this embodiment, the mobile device is equipped with a GPS transceiver. FIG. 24 shows an example map of a school campus, where a specific geographic area 920 is designated as the zone where a mobile device can be accessed. In one example, mobile device 922 is outside of the area 920. Using the GPS data, the mobile device determines that it is not located within the boundaries of geographic area 920 and a default incorrect context data is set to be provided for any key press data. In this example, the reference data can be a range of valid GPS coordinates. Therefore while the proper key press data may be entered at this time, the wrong context data is provided with each key press data. Therefore attempts to access content will be unsuccessful. In one example any content designated as being secured within the geographic area 920 cannot be accessed, however other content of the mobile device may be accessible. In another example, all content of the entire mobile device 922 cannot be accessed. Specific content which can or cannot be accessed in this embodiment can be set by the authority governing the content of geographic area 920, such as the school administration in the example of FIG. 24. While geographic area 920 has a rectangular shape in the example of FIG. 24, an area having any shape can be used.

On the other hand, mobile device 924 is located within the boundaries of geographic area 920 which is detectable by its GPS transceiver. In this situation, the context data is set to the correct value and any key press data will have the proper corresponding context data provided with it. This will result in access to content as the valid password key presses and context data is provided to the password authentication system. In alternate embodiments, any type of information which the mobile device can use to determine its geographic location relative to geographic area 920 can be used in the same way for enabling the password authentication system of the previously described embodiments. The geometric area can be any size, and is limited by the accuracy and resolution of the GPS system.

According to an alternate embodiment, the GPS information can be used in a context function whereby the x,y coordinate data (longitude and latitude information) is used to transform a key code into a new password. For example, each numeric input can be multiplied with the x, y or both x and y coordinates corresponding to the location of inputting. A range of possible valid passwords based on the context function using valid x,y coordinates may be preset if access to content of the mobile device is permitted for a specific area.

The aforementioned geometric context is fixed to reference points in the real world. A regional context can be used regardless of the geographic location of the mobile device. In one embodiment, personal near field communications (NFC) can establish a regional zone within which the correct context data is provided with the key press data. With reference to FIG. 23, a user having at least one portable sensor 902 with NFC to communicate biometric signals of the previously mentioned types to the mobile device 904 will be sufficient to set the correct context for the password authentication system. The NFC range can be configured to be sufficiently close to the portable sensor 902 so that signal strength is optimal for reliable sensing by the mobile device 904. When said biometric signals are sensed by the mobile device, the proper context data is set for the password entry operation. However, if the mobile device 904 can no longer sense the biometric signals from the portable sensor 902, then a default incorrect context data is set. In this embodiment, it is not necessary to use a biometric sensor. Instead, an emitter that provides a preset code recognizable by the mobile device as being valid can be used. The advantage of using a biometric sensor is that it is configurable to provide a signal unique to a particular individual.

Figure 25:
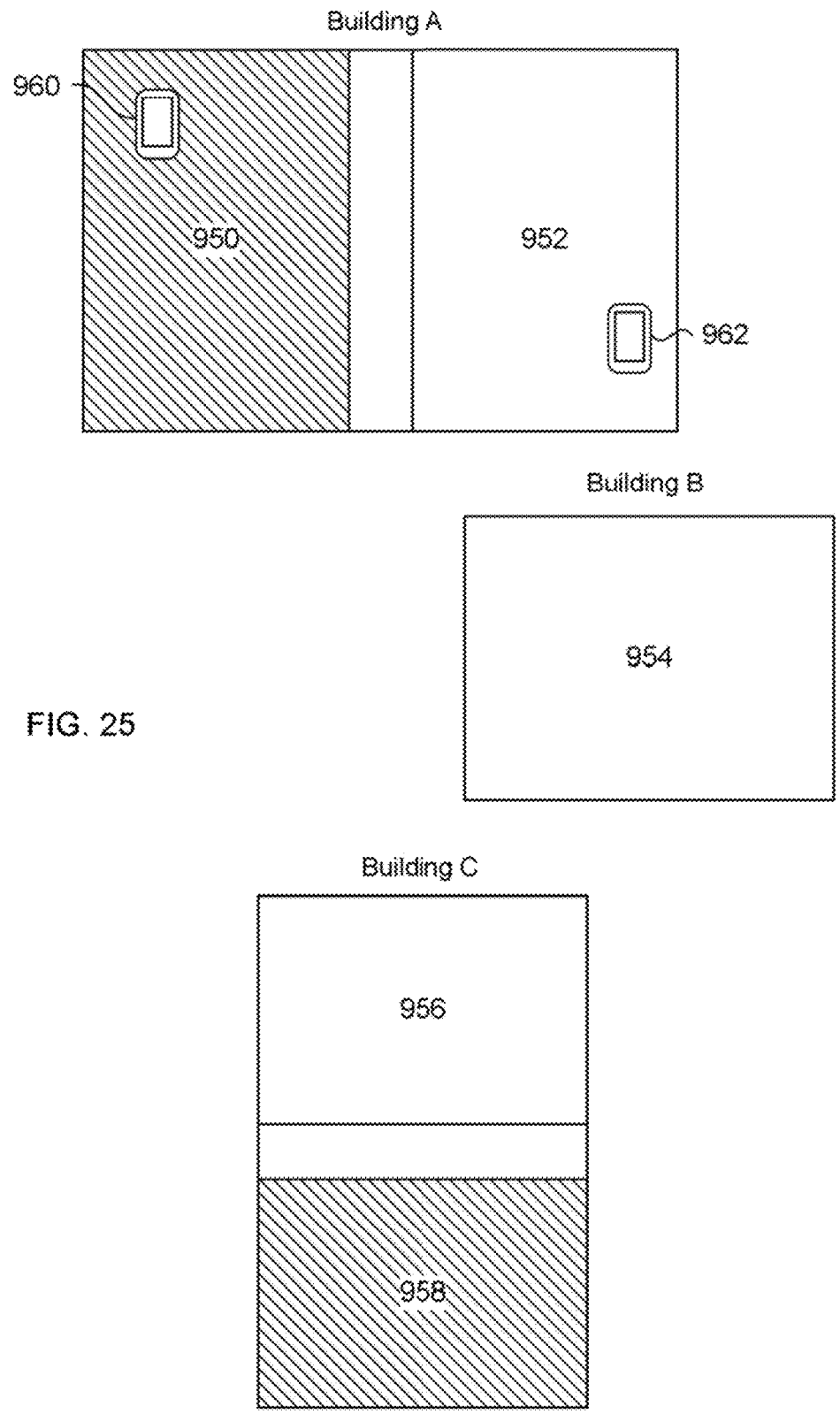
FIG. 25 is an illustration of an example of a network context, according to a present embodiment; and, FIG. 26 is a flow chart of a password authentication method using external contexts, according to a present embodiment.

Another example external context is a network context, where wireless (WiFi) and NFC sources can provide a signal unique to the network. Upon detection of a valid network, correct context data is set for the password authentication system by the mobile device. Those skilled in the art understand that a wireless network can be configured to push codes to mobile devices. An advantage of a network based context is that the areas where access to content is authorized can be selective, and dynamically changed. FIG. 25 shows an example implementation of a network context, according to a present embodiment. Plan view layouts of 3 buildings are shown, Building A, Building B and Building C. Building A has two office space areas, 950 and 952, Building B has a single office space area 954, and Building C has two office space areas 956 and 958. If an organization has a valid network in office space areas 950 and 958, then wireless networks can be set up to emit valid codes in those areas only. Therefore, upon receiving the proper code for the network when the mobile device 960 is within the range of the wireless networks in areas 950 and 952, the correct context data is set by the mobile device. Thus the user can access content only if they are in either office space areas 950 and 958, and have entered the proper password. Otherwise, when a mobile device 962 is in an office space area where the network is not present, then an incorrect default context data is set and entry of the proper password will not result in access to content.

If the organization expands and occupies office space area 952 in the future, then a wireless network can be set up in that area to provide the same code as in area 950. The wireless network can be implemented via WiFi, Bluetooth or any other suitable wireless system that the mobile device is compatible with.

Other external contexts can include time, day or month, where the correct context is set only for specific ranges of time, days or months. For such external contexts, signals including the time, day or month information is received from a host network system in the communication signals and compared to reference time, day or month data stored in the mobile device. While biometrics have been described as an alternate form of key press entry, a biometric parameter can also serve as an external context.

The previously described embodiments employing external contexts can be implemented by the mobile device 700 of FIG. 17. While not shown in FIG. 17, the mobile device 700 can include a GPS transceiver in the RF communications block 704 for communicating with global positioning satellites for the purposes of calculating a position of the mobile device 700. The resulting position information can then be used by the processor 702 to determine if the mobile device is located within a specific predetermined area. It is noted that dedicated circuit blocks or existing functional blocks of the processor for detecting external contexts are analogous to the context input interface 802 shown in the embodiment of FIG. 18, in that they detect the external context and set a particular context for the mobile device. The authentication password generator of the previous embodiments can include comparison logic for determining if the sensed parameters of the external context match or mismatch predetermined reference parameters for that external context.

Figure 26:
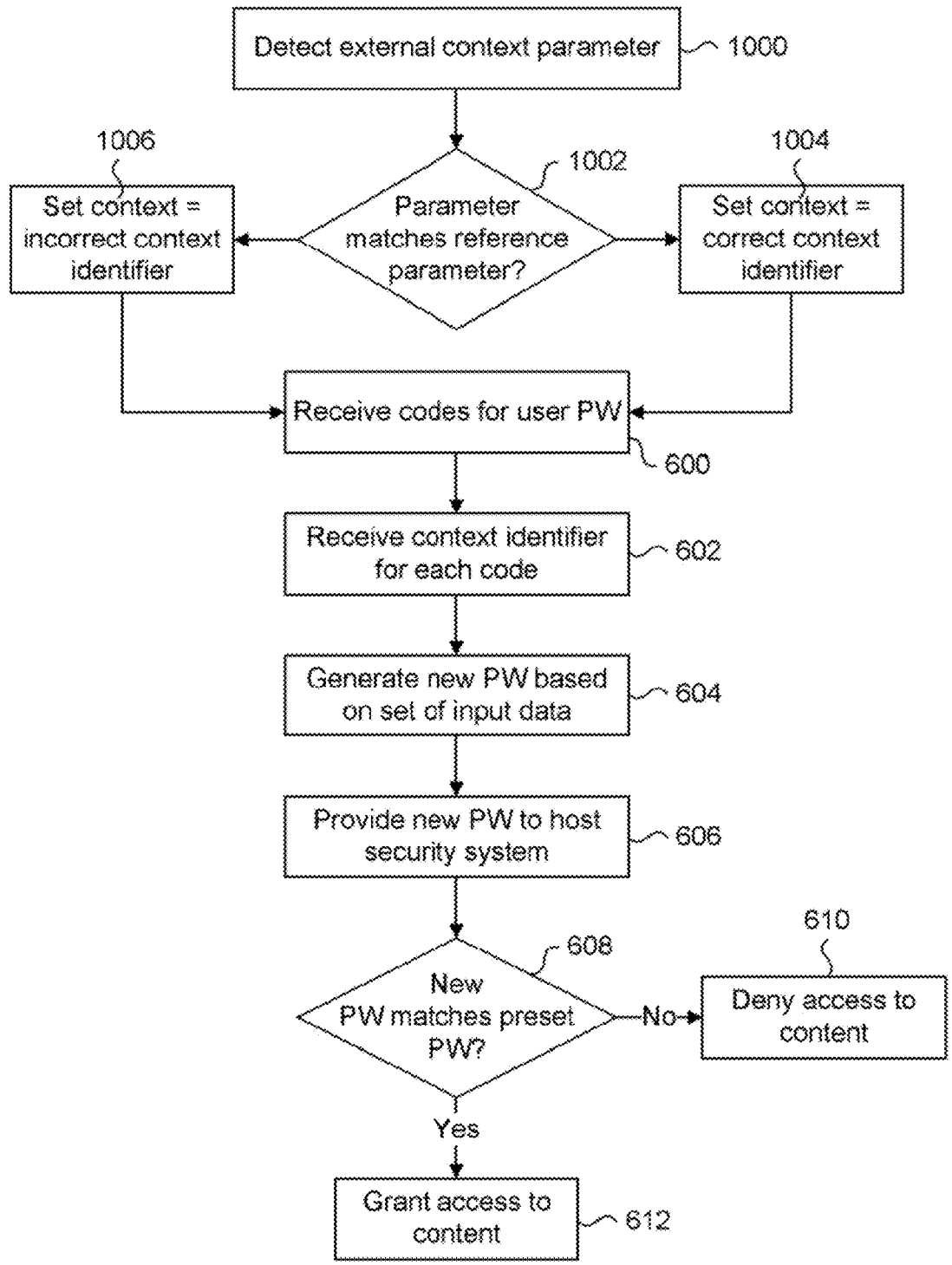

FIG. 26 is a flow chart of a password authentication method using external contexts, according to a present embodiment. The method starts at 1000 where the mobile device senses a parameter of an external context, such as GPS signal, time, date or network for example. At 1002, the mobile device compares a signal or code parameter of the external context to a predetermined reference signal or code. If there is a match, the method continues to 1004 and the mobile device automatically sets itself to a designated correct context identifier. Otherwise in the case of a mismatch, the method continues to 1006 and the mobile device either maintains the current default incorrect context identifier, or automatically sets a different incorrect context identifier.

In either situation, the method then executes steps 600 through 612 which are the same ones as shown in the embodiment of FIG. 16. The only difference being that context data received for each code will be the same correct or incorrect context code. Of course, if the incorrect context data has been set for the mobile device, then access to content will be denied at 610. Otherwise, access to content is granted at 612.

In a variation of the method of FIG. 26, the incorrect context identifier sets one mapping of codes to the keys which differs from the mapping of codes to the keys in the correct context. This mapping of codes to keys can be done in the same way as previously mentioned for the embodiment of FIG. 6. In this modified version of FIG. 26, step 602 is omitted.

The previously described external contexts can be alternatively used to enable the password authentication embodiments, instead of setting a correct context for password entry. In other words, the key input interface for allowing key press entry is enabled only when the valid external context is detected. In the absence of a valid external context, the key input interface is not presented and there is no opportunity or means to access content. When enabled, any of the previously described password authentication embodiments can be initiated to allow the user an opportunity to access content. Such external contexts allows an organization to control when and/or where access to the mobile device is permitted, based on their desired internal policy.

Similarly, the previously described biometric based contexts can be alternatively used to enable the password authentication embodiments. Such a system can be useful in applications where a mobile device is shared amongst a group of authorized users. Each user's biometric input enables a profile on the mobile device, which includes their unique password for accessing only their content on the mobile device.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A system for generating password data from user input on a computing device, comprising:
   a memory device for storing computer executable instructions;
   a processor in communication with the memory device;
   an interface configurable to operate in one or more of a plurality of different contexts for providing code data corresponding to each entry of a user entered password, the interface including a keypad input interface responsive to key press entries and a sensor for sensing biometric input entries, where a sequence comprising at least one key press entry and at least one biometric input entry corresponds to the user entered password, the interface configured to associate a first context to the at least one key press entry and to automatically associate a second context to the at least one biometric input entry, where the first and second contexts are different; and,
   a password generator receiving the code data and context data corresponding to the contexts during which the code data was entered including the first and second contexts, for converting using the processor the code data and the corresponding context data into a new password.

2. The system of claim 1, wherein the interface includes a feedback generator for providing an indicator in response to selection of either of the one or more contexts.

3. The system of claim 1, wherein the interface includes a context input interface for selecting the one or more contexts.

4. The system of claim 3, wherein the context input interface includes a physical button of the computing device for selecting one or more contexts when depressed.

5. The system of claim 3, wherein the context input interface includes a graphical interface of the computing device for selecting one or more contexts when touched.

6. The system of claim 3, wherein the context input interface includes a sensor of the computing device for selecting one or more contexts when different orientations of the computing device is detected.

7. The system of claim 3, wherein the context input interface includes a biometric sensor for selecting one or more contexts in response to a match between a sensed biometric parameter and a reference parameter.

8. The system of claim 3, wherein the keypad input interface is configurable to operate in one or more contexts, each same key of the keypad interface providing different code data when operating in a different context.

9. The system of claim 8, wherein the password generator includes context mapping tables each selectable by the context input interface for converting received code data corresponding to each entry of a user entered password into new code data different than the received code data.

10. The system of claim 9, wherein a character length of the new password is the same as the user entered password.

11. The system of claim 3, wherein the keypad input interface provides the code data corresponding to each entry of a user entered password, and the context input interface is configured to provide context data corresponding to the selected context for each entry.

12. The system of claim 11, wherein the password generator includes a hash function generator for converting the code data and corresponding context data of the user entered password entries into the new password.

13. The system of claim 12, wherein a character length of the new password is greater than the user entered password.

14. The system of claim 1, wherein the feedback generator includes a graphical display for providing a visual indication in response to selection of either of the one or more contexts.

15. The system of claim 1, wherein the feedback generator includes a haptic feedback system for providing a physical indication in response to the selection of either of one or more contexts.

16. The system of claim 15, wherein the physical indication includes at least one of audible sounds and vibration of the computing device.

17. The system of claim 3, wherein the context input interface includes a context detector for sensing a parameter of an external context, and for automatically setting one or more contexts when an external context is detected.

18. The system of claim 17, wherein the external context can include any one of geographic position, time of day, date, network presence and a biometric.

19. The system of claim 1, wherein different biometric input entries generate different key code data.

* * * * *